US009031782B1

(12) United States Patent
Lemay et al.

(10) Patent No.: US 9,031,782 B1
(45) Date of Patent: May 12, 2015

(54) SYSTEM TO USE DIGITAL CAMERAS AND OTHER SENSORS IN NAVIGATION

(71) Applicants: Lee C. Lemay, San Diego, CA (US); Justin E. Gorgen, San Diego, CA (US); Demoz Gebre-Egzhiabher, Minneapolis, MN (US)

(72) Inventors: Lee C. Lemay, San Diego, CA (US); Justin E. Gorgen, San Diego, CA (US); Demoz Gebre-Egzhiabher, Minneapolis, MN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 71 days.

(21) Appl. No.: 13/744,047

(22) Filed: Jan. 17, 2013

Related U.S. Application Data

(60) Provisional application No. 61/589,410, filed on Jan. 23, 2012.

(51) Int. Cl.
*G01C 21/16* (2006.01)
*G01C 21/00* (2006.01)

(52) U.S. Cl.
CPC ....................................... *G01C 21/00* (2013.01)

(58) Field of Classification Search
USPC ......... 701/474, 480, 500, 501, 509–511, 518, 701/534–536, 426, 445, 472, 408, 409
See application file for complete search history.

(56) References Cited

U.S. PATENT DOCUMENTS

2008/0063270 A1* 3/2008 McClelland et al. ......... 382/170
2008/0167814 A1* 7/2008 Samarasekera et al. ...... 701/213

OTHER PUBLICATIONS

Durrant-Whyte, H.; Bailey, T.; , Simultaneous localization and mapping: part I, Robotics & Automation Magazine, IEEE, vol. 13, No. 2, pp. 99-110, Jun. 2006.
Elphel Inc., Specification Sheet for Elphel 353. www.elphel.com.
Bailey, T.; Durrant-Whyte, H.; , Simultaneous localization and mapping (SLAM): part II, Robotics & Automation Magazine, IEEE, vol. 13, No. 3, pp. 108-117, Sep. 2006.

(Continued)

*Primary Examiner* — Adam Tissot
(74) *Attorney, Agent, or Firm* — SPAWAR Systems Center Pacific; Kyle Eppele; Stephen E. Baldwin

(57) ABSTRACT

In one preferred embodiment, the present invention provide a navigation system for a movable platform comprising a GNSS receiver sensor for providing position signals representative of the estimated current position of the movable platform; a camera sensor for providing photographic images representative of the surroundings of the movable platform; and an IMU (Inertial Measurement Unit) sensor for providing specific force and angular rate signals representative of the current specific forces and rate of the movable platform. A processor is responsive to the camera photographic images to estimate the position and attitude of the movable platform, the covariance of the position and attitude estimates and the covariance of consecutive position and attitude estimates. The processor is responsive to the GNSS receiver's estimated position signal, the camera's estimated position and attitude signal, the camera's estimated position and attitude covariance, the camera's estimated correlation of the covariance of consecutive position and attitude estimates, and the specific force and angular rate signals, for providing a navigation solution representative of the estimated current position, velocity, and attitude of the movable platform.

10 Claims, 28 Drawing Sheets

(56) References Cited

OTHER PUBLICATIONS

M. J. Veth, Fusion of Imaging and Inertial Sensors for Navigation, Ph.D. Dissertation (AFIT/DS/ENG/06-09), US Air Force Institute of Technology, Wright-Patterson Air Force Base, Ohio. Aug. 2006.

S. I. Roumeliotis, A.E. Johnson, and J.F. Montgomery. "Augmenting Inertial Navigation with Image-Based Motion Estimation," Proceedings of the IEEE International Conference on Robotics and Automation (ICRA '02), vol. 4, pp. 4326-4333. 2002.

A. I. Mourikis, N. Trawny, S. I. Roumeliotis, A. E. Johnson, and J.F. Montgomery. "Vision-Aided Inertial Navigation for Precise Planetary Landing: Analysis and Experiment," Proceedings of the IEEE International Conference on Robotics and Automation (ICRA '02), vol. 4, pp. 4326-4333. 2002.

Herber Bay, Andreas Ess, Tinne Tuytelaars, Luc Van Gool, "SURF: Speeded Up Robust Features," Computer Vision and Image Understanding (CVIU), vol. 110, No. 3, pp. 346-359, 2008.

L. Lemay, C. Chu, D. Gebre-Egziabher and R. Ramllal, "Precise Input and Output Error Characterization for a Loosely Integrated INS/GPS/Camera Navigation System," Proceedings of the Institute of Navigation (ION) 2011 International Technical Meeting, San Diego, CA., Jan. 2011.

J. Raquet and M. Giebner. "Navigation Using Optical Measurements of Objects at Unknown Locations," Proceedings of the 59$^A$th Annual Meeting of the Institute of Navigation, pp. 282-290. Jun. 2003.

van Huffel, S, and Vandewalle, J. "Analysis and Properties of the Generalized Total Least Squares Problem AX=B when Some or All Columns are Subject to Error," SIAM Journal of Matrix Analysis and Applications, vol. 10, No. 3, 1989. pp. 294-315.

Golub, G. H. and van Loan, C. F., "An Analysis of Total Least Squares Problem," SIAM Journal of Numerical Analysis, vol. 17, No. 6, 1980. pp. 883-893.

Mühlich, M. and Mester, R., "The Role of Total Least Squares in Motion Analysis," Proceedings of the European Conference on Computer Vision, 1998 (ECCV '98), Freiburg, Germany, 1998. pp. 305-321.

Gorgen, J., and Lemay, L., Algorithm for Triangulating Visual Landmarks and Determining their Covariance, SPAWAR Systems Center, Pacific Report, Jul. 2011.

Systron Donner Inc., SDG-1000 User's Guide: Model SDG-1000 Rate Sensor, Document # 965419, Rev. A Concord, CA.

Gladiator Technologies Inc., A40 MEMS Accelerometer Specification Sheet, Rev Apr. 2011.

C. Chu, D. Gebre-Egziabher, F. A. P. Lie, L. Lemay "Performance Comparison of Tight and Loose INS-Camera Integration," Proceedings of the Institute of Navigation (ION) 2011 GNSS, Portland, OR., Sep. 21-23.

T. Papadopoulo, M.I.A. Lourakis, "Estimating the Jacobian of the Singular Value Decomposition: Theory and Applications," Proceedings of the European Conference on Computer Vision, ECCV'00, 2000 pp. 554-570.

A. Bryson, L. Henrikson, "Estimation using sampled data containing sequentially correlated noise," Journal of Spacecraft and Rockets, Jun. 1968, pp. 662-665.

\* cited by examiner 2A　　　　　　　　　　　2B

US 9,031,782 B1

SYSTEM TO USE DIGITAL CAMERAS AND OTHER SENSORS IN NAVIGATION

CROSS-REFERENCE TO RELATED PATENT APPLICATIONS

The present application is related to provisional patent application Ser. No. 61/589,410, filed Jan. 23, 2012, entitled SYSTEM TO USE DIGITAL CAMERAS AND OTHER SENSORS IN NAVIGATION, assigned to the same assignee as the present invention, the details of which are hereby incorporated by reference herein, and priority is claimed herein under 35 USC §119(e).

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619)553-2778; email T2@spawar.navy.mil.

BACKGROUND OF THE INVENTION

In the prior art, landmarks that were triangulated using a navigation system and a camera used computationally expensive algorithms such as particle filters or methods such as Simultaneous Localization and Mapping (SLAM) to estimate the landmark position error. Some prior methods simply guessed the position error of triangulated landmarks.

Navigation solutions were commonly estimated using a Global Positioning System (GPS) receiver and an inertial measurement unit (IMU). This has the disadvantage that if GPS is unavailable (as it is in many areas such as in buildings, shopping malls, underground parking structures), then the navigation solution will decay unless the IMU is of a high quality and thus very expensive. Navigation solutions were also estimated using inertial measurement units and digital cameras. The measurements were integrated at the tight level, which means that pixel measurements were combined with accelerometer and gyroscopes measurements from the IMU. In this method, if the system has a poor current estimate of its navigation state, it may enter a failure mode that produces incorrect navigation solutions from which it cannot recover. This can occur as a consequence of having an inexpensive IMU.

SUMMARY OF THE INVENTION

In one preferred embodiment, the present invention provide a navigation system for a movable platform comprising a GNSS receiver sensor for providing position signals representative of the estimated current position of the movable platform; a camera sensor for providing photographic images representative of the surroundings of the movable platform; and an IMU (Inertial Measurement Unit) sensor for providing specific force and angular rate signals representative of the current specific forces and rate of the movable platform. A processor is responsive to the camera photographic images to estimate the position and attitude of the movable platform, the covariance of the position and attitude estimates and the covariance of consecutive position and attitude estimates.

The processor is responsive to the GNSS receiver's estimated position signal, the camera's estimated position and attitude signal, the camera's estimated position and attitude covariance, the camera's estimated correlation of the covariance of consecutive position and attitude estimates, and the specific force and angular rate signals, for providing a navigation solution representative of the estimated current position, velocity, and attitude of the movable platform.

BRIEF DESCRIPTION OF THE DRAWINGS

The invention will be more fully described in connection with the annexed drawings, where like reference numerals designate like components, in which.

DETAILED DESCRIPTION OF THE PREFERRED EMBODIMENTS

One preferred embodiment of the navigation system of the present invention includes a GPS receiver, an Inertial Measurement Unit, a Magnetometer triad, a digital camera, and a microprocessor. Data is collected and the algorithms that make up the invention were applied in post-processing. In one embodiment, a van was driven through Liberty Station in San Diego, Calif. for an hour. Data from all of the sensors was recorded and used in post-processing to validate the sensor fusion algorithms that have been developed.

This invention can be used in all military or non-military applications when navigation needs to occur in a GPS-denied environment, such as indoors, underground, or underneath dense foliage. It can also be used as a backup to GPS to provide robust navigation in the event that GPS becomes unavailable.

The invention estimates a navigation solution based on inputs from different sensors, including at least a digital camera. Other sensors that may be included are GPS receivers, inertial measurement units (IMUs), compasses, and others. The navigation solution includes but is not limited to estimates of position, attitude, and velocity. The invention includes the sensors as well as a microprocessor that processes the sensor data and creates the navigation solution estimates.

The sensor measurements may be combined using a loose integration methodology, meaning that each individual sensor will give an estimate of one or more of the states of the navigation solution. For example, the GPS receiver will measure position and optionally velocity, the IMU will measure position, velocity, and attitude, and the camera will measure position and attitude, etc.

The sensor measurements may also be combined in a tight integration methodology, meaning that the raw measurements from multiple individual sensors will be used to provide an estimate of one or more of the states of the navigation solution. For example, the GPS receiver will measure pseudoranges and deltaranges, the IMU will measure specific forces and angular rates, and the camera will measure pixel locations of feature points, etc. The filter will switch between tight and loose integration to provide the most optimal non-divergent navigation solution.

As described above, in the past, landmarks that were triangulated using a navigation system and a camera used computationally expensive algorithms such as particle filters or methods such as SLAM to estimate the landmark position error. Some prior methods simply guessed the position error of triangulated landmarks.

Figure 3:
FIG. 3 shows a navigation solution using IMU and GPS.
Figure 4:
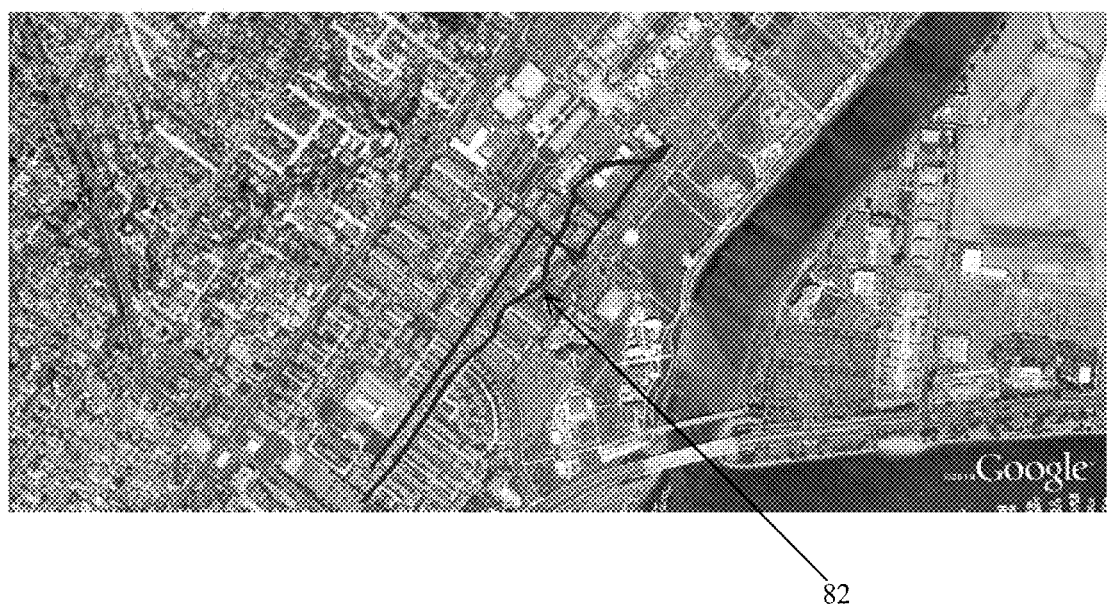
FIG. 4 shows a navigation solution using only IMU.

As also described above, in the past, navigation solutions were commonly estimated using GPS and an IMU. This has the disadvantage that if GPS is unavailable, then the navigation solution will decay unless the IMU is of a high quality and thus very expensive. FIG. 3 shows the calculated trajectory of the van using the complete GPS and IMU solution. FIG. 4 shows the calculated trajectory of the van using just the IMU. In FIG. 3, the navigation solution using IMU and GPS is close to truth, as shown by path 80. In FIG. 4, the navigation solution using only an IMU has large errors, as shown by path 82.

As also described above, in the past, navigation solutions were also estimated using inertial measurement units and digital cameras. The measurements were integrated at the tight level, which means that pixel measurements were combined with accelerometer and gyroscopes measurements from the IMU. In this method, if the system has a poor estimate of its current navigation state, it may enter a failure mode that produces incorrect navigation solutions from which it cannot recover. This can occur as a consequence of having an inexpensive IMU.

The invention features a number of different sensors which provide measurements to a microprocessor. The microprocessor (processor) can process the measurements, and then it uses them in an Extended Kalman Filter (EKF.) The EKF uses the measurements to estimate the position, velocity, attitude, and other states of the system, such as gyroscope and accelerometer biases and scale factor errors, camera calibration parameters, and other correlated error sources. The EKF is shown in FIG. 1A.

The software processes measurements from GPS, an IMU, a digital camera, a compass, and a zero velocity update (ZVU) signal.

Figure 1A:
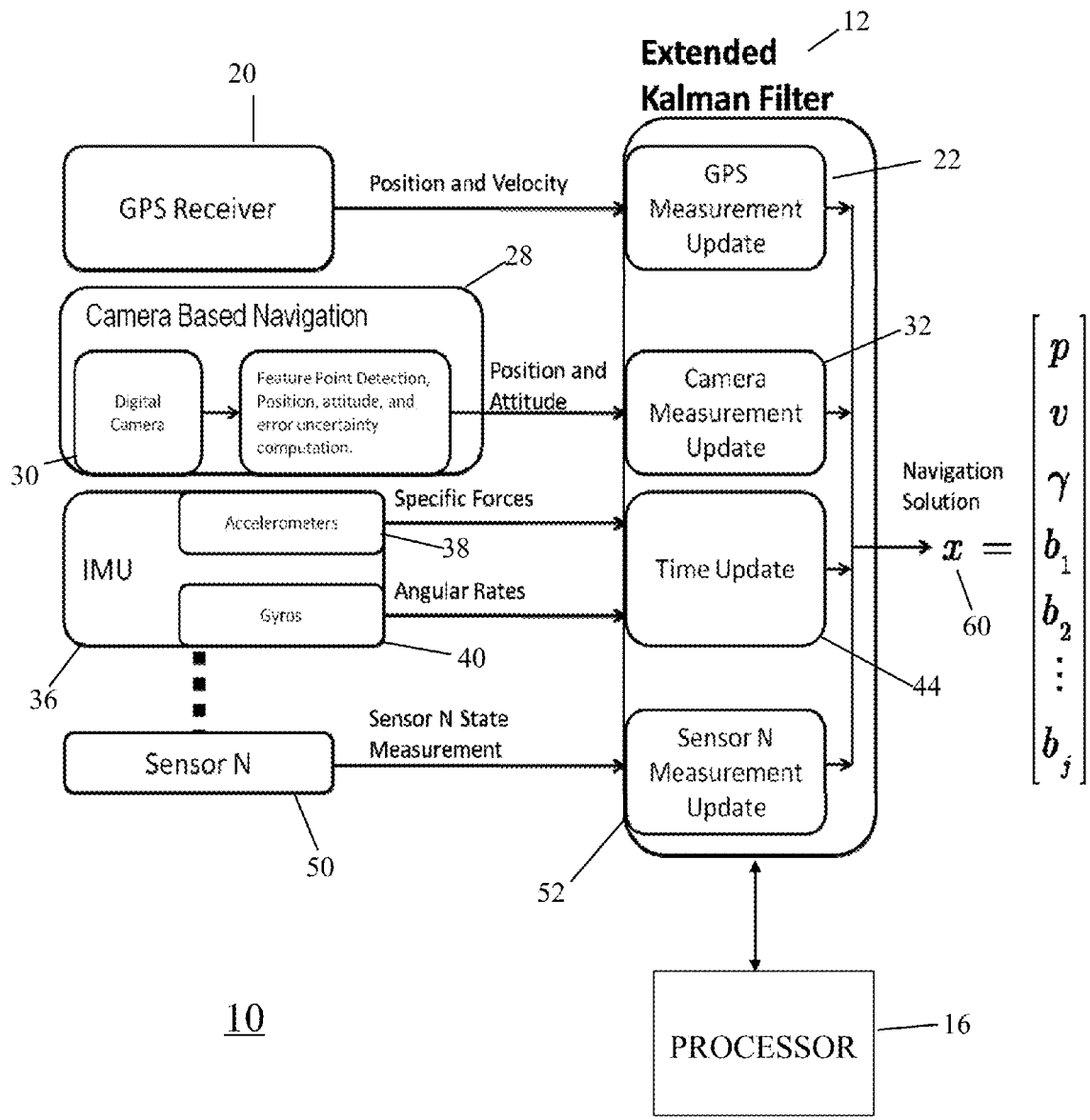
FIG. 1A shows a block diagram of one preferred embodiment of a navigation system of the present invention.

The block diagram showing a preferred embodiment of a navigation system 10 is shown in FIG. 1A, which includes a multi-state Extended Kalman Filter (EKF) 12 with Processor 16. In FIG. 1A, the GPS Receiver sensor 20 provides position and velocity signals to the GPS Measurement Update state 22 of the EKF 12.

The Camera Based Navigation sensor 28 includes a Digital Camera 30 for landmark detection, position, attitude and error uncertainty computation. The Camera Based Navigation sensor 28 provides position and attitude signals to the Camera Measurement Update state 32 of the EKF 12.

The IMU (Inertial Measurement Unit) sensor 36 includes accelerometers 38 and gyroscopes 40 for providing specific forces and angular rate signals to the Time Update state 44 of the EKF 44.

Additional sensors 50 can be included for Sensor N State Measurement signals which are provided to the Sensor N Measurement Update state of the EKF 12. The EKF 12 of FIG. 1A, in conjunction with Processor 16, provides the Navigation Solution $\chi$ (designated as 60), where $\rho$ is the position vector v is the velocity vector $\gamma$ is the attitude vector consisting of roll ($\phi$), pitch ($\theta$), and yaw ($\psi$)

b1 can be the accelerometers output bias vector b2 can be the gyro output bias vector The EKF 12 of FIG. 1A can integrate sensors measurements at the loose level—that is, each sensor outputs a state or a number of states that the EKF is estimating, such as velocity or attitude. The GPS receiver estimates position and optionally estimates velocity. The IMU estimates position, velocity, and attitude. The camera estimates position and attitude. The microprocessor is running unique algorithms to convert images from the digital camera into measurements of position and attitude, and to assign a covariance to each of these measurements.

Figure 1B:
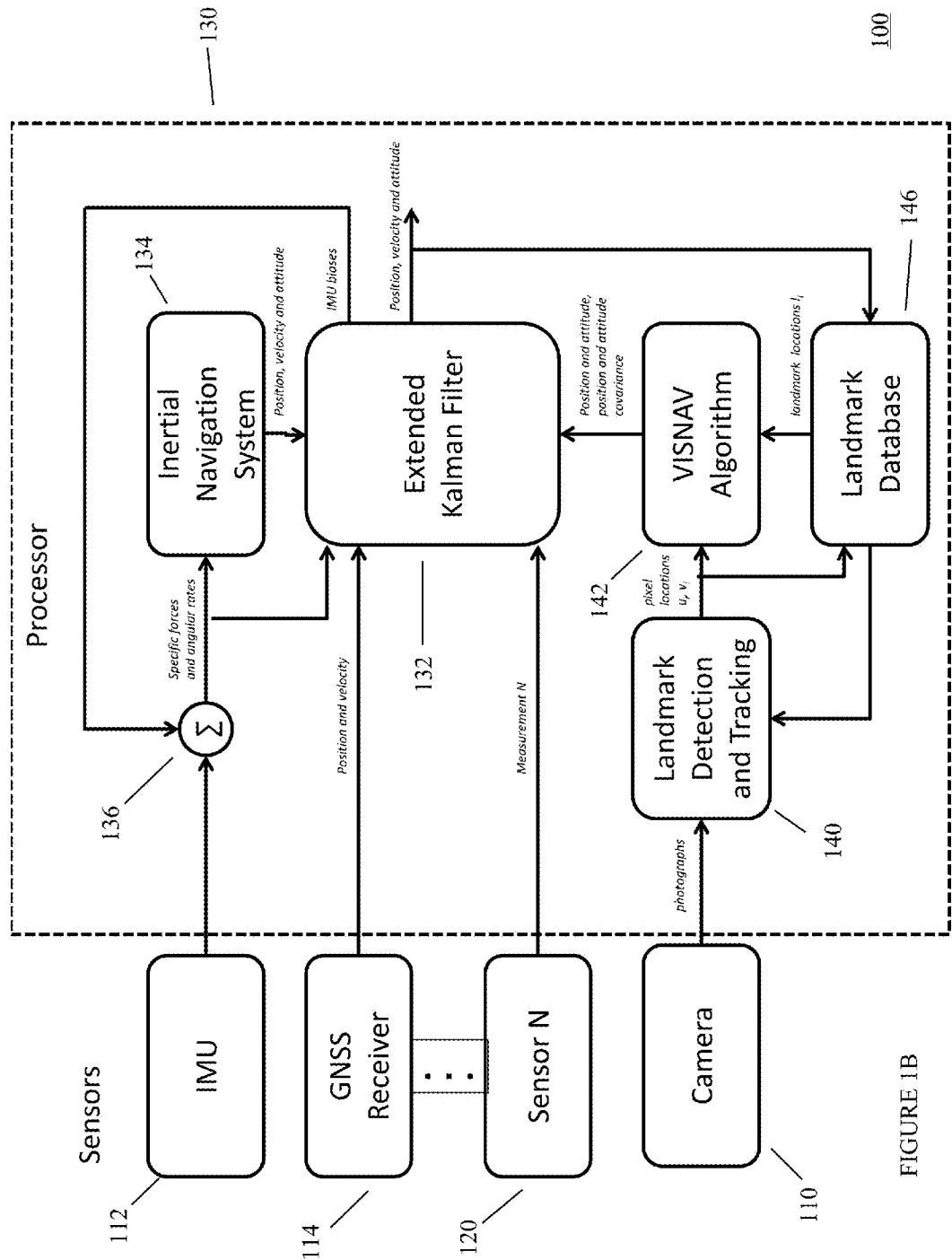
FIG. 1B shows a block diagram of another preferred embodiment of a navigation system of the present invention.

FIG. 1B is a schematic of another preferred embodiment of a navigation system 100, for use with a movable platform (such as a vehicle). In FIG. 1B, a camera 110 is integrated into a movable platform's navigation system 100 with an IMU 112 and GNSS receiver 114. The outputs of the IMU 112 are the specific forces and angular rates that the IMU 112 senses from the platform, which describe its dynamics. Additional sensors 120 (e.g., N sensors) can be utilized with the navigation system 100. The outputs of the sensors 110, 112, 114, . . . , 120 are input to processor 130.

In FIG. 1B, the components of processor 130 include Extended Kalman Filter (EKF) 132, Inertial Navigation System (INS) 134, Summer 136, Landmark Detection and Tracking component 140, VISNAV Algorithm component 142 and Landmark Database 146.

Standard inertial navigation equations use the IMU's sensed specific forces and angular rates to create an Inertial Navigation System (INS) 134, which uses the sensed specific forces and angular rates to form estimates of the platform's current navigation state.

The GNSS receiver 114 and camera 110 are used to directly measure the platform's navigation state, and these measurements are input in a fusion filter (preferably an Extended Kalman Filter) to produce estimates of the IMU biases in its sensed specific forces and angular rates, and to produce estimates of the error in the Inertial Navigation System's estimate of the platform's navigation state. The outputs of the GNSS receiver 114 are estimates of the platform's position and velocity.

The outputs of the camera 110 are photographs (photographic images) of the surroundings of the platform, which are then fed into a landmark detection and tracking algorithm 140. The landmark detection and tracking algorithm 140 will output the pixel coordinates of the $i^{th}$ landmark in the camera's imaging plane, $u_i$ and $v_i$. The $u_i$ and $v_i$ pixel coordinates and the locations of the $i^{th}$ landmark are used in the VISNAV algorithm 142 to generate a camera-based estimate of the platform's position and attitude, as well as covariance estimates of the estimated position and attitude.

The information from the INS 134, the GNSS receiver 114, the VISNAV algorithm 142, and any additional sensors is fed into the fusion filter 132, which in one preferred embodiment is an Extended Kalman Filter (EKF).

The navigation state of the platform, x, consists of the platform's position, velocity, attitude and IMU specific forces and angular rates bias's. The EKF is forming estimates of the error in the current INS estimate of x.

FIG. 2A shows a photograph taken by the camera sensor, and FIG. 2B shows a photograph of the same scene taken from the same camera sensor. The camera's position and attitude are different for FIG. 2A and FIG. 2B. The horizontal lines 74 show successfully matched feature points in between the two photographs; that is, image processing algorithms have detected that the end points of the horizontal lines 74 are the same objects appearing in different photos.

FIG. 3 shows the navigation solution of a navigation system that has only the GPS and IMU as sensors, and no camera. The latitude, longitude, and altitude have been plotted on Google Earth, and it is clear from visual inspection that the results are reasonable.

FIG. 4 shows the navigation solution of a navigation system that has only the IMU as a sensor, and no GPS or camera. The trajectory in FIG. 4 is the same trajectory as was shown in FIG. 3. The latitude, longitude, and altitude have been plotted on Google Earth, and it is clear that the results have much larger errors than that of the GPS and IMU.

Figure 5:
FIG. 5 shows a navigation solution using a camera and IMU.

FIG. 5 shows the navigation solution of a navigation system that has only the camera and IMU as sensors, and no GPS. The trajectory in FIG. 5 is the same trajectory as was shown in FIG. 3. The latitude, longitude, and altitude have been plotted on Google Earth, and are quite close to the GPS/IMU results. This indicates the accuracy of the IMU and camera solution.

Figure 2:
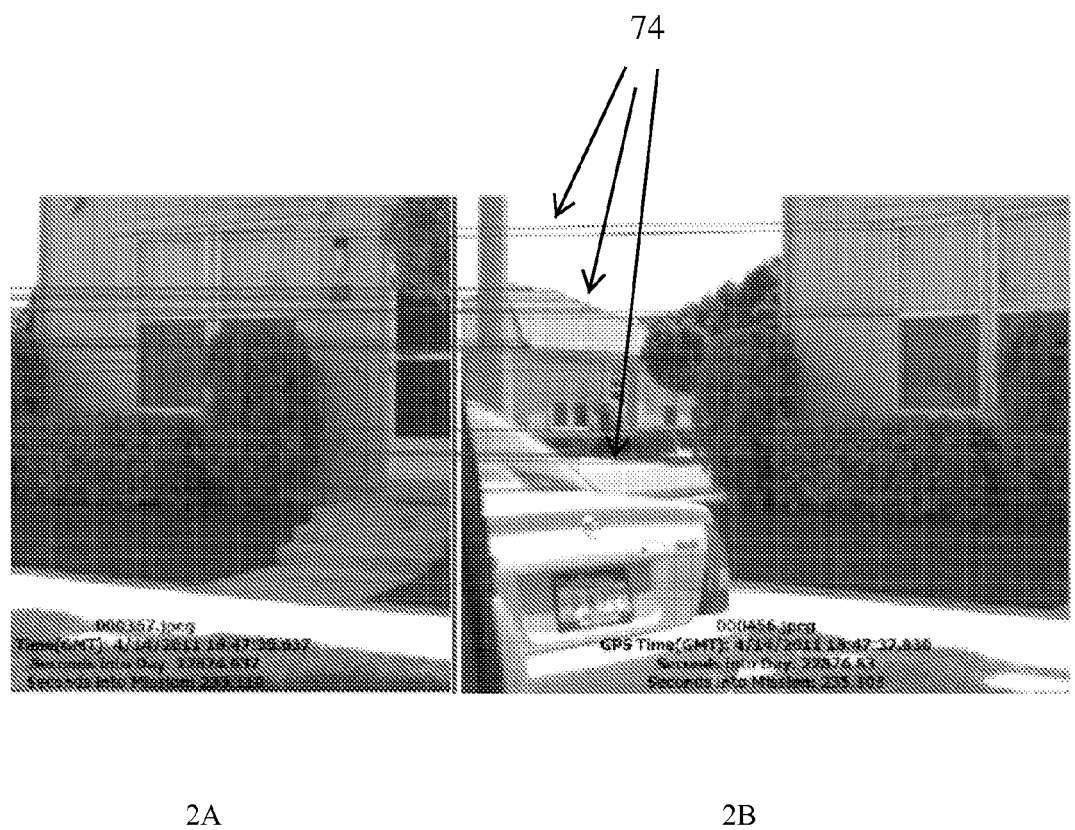
FIGS. 2A and 2B shows an illustration of feature points.

The algorithm to convert images from the digital camera into measurements of position and attitude works as follows. Matching landmarks are found in photographs that are taken from different locations. This is shown in FIG. 2. Through the process of triangulation, estimates of the position of the feature points are made. Additionally, an estimate of the error in the estimated position of the feature point is made—this is the uncertainty in their position. This process is called surveying the landmarks.

After a landmark has been surveyed, it can be used to navigate when it is detected in subsequent photographs. By using the landmark's estimated position, it's estimated position error, the detected pixel coordinates, and the uncertainty in the pixel coordinates, it is possible to solve for the position, attitude, and the position and attitude covariance of the camera.

When the same landmark appears in multiple photographs, the error that is associated with that landmark will influence multiple camera measurements, which leads to a time correlated measurement error in the camera's estimate of position and attitude. The well known method of measurement differencing is used to account for this time correlated error. The inventors have derived a novel way of calculating the exact correlation in the error in between multiple measurements, which is a necessary input to the method of measurement differencing.

Note that it is possible to survey the feature points ahead of time, even using an entirely different system or technique, and then use the a priori surveyed feature points to navigate.

In another embodiment, the EKF could also integrate sensor measurements at the tight level—that is, the output of each sensor is the raw sensor data, which is then combined with the raw sensor data from other sensors and used to estimate a state or a number of states that the EKF is estimating, such as velocity or attitude. The GPS receiver provides pseudoranges and deltaranges, the IMU provides specific forces and angular rates, and the camera provides pixel locations of detected landmarks. The microprocessor then fuses the raw sensor measurements to obtain estimates of the states in the EKF.

The EKF could run in the tight mode or in the loose mode, depending on the current state of the system. The tight mode has the advantage that it provides an optimal estimate of the navigation state, since the input measurements have uncorrelated errors. However, the tight integration can diverge if the solution form the IMU it is using is incorrect. The loose integration is less prone to diverging, and so is a more robust mode of operation.

However, the position and attitude estimates produced by the camera have correlated errors, and so in the loose integration the estimate of the navigation state will be sub-optimal. The EKF will detect if it is in a potentially divergent condition, and if it is, it will run in the loose integration. If it is not, it will run in the tight integration.

This invention has the advantage of rigorously estimating the position error associated with a landmark that has been triangulated using a navigation system and a camera. It does so in a computationally inexpensive fashion.

This invention has the advantage over the GPS/IMU integration in that the accuracy of the navigation solution will not decay as quickly in the absence of GPS. FIG. 5 shows the calculated trajectory of the van using the IMU and the camera, and is clearly superior to the performance of the IMU without GPS from FIG. 4. In FIG. 5, the navigation solution using a camera and IMU is close to truth, as shown by path 84.

This invention has the advantage over the tightly coupled vision/IMU implementation in that the system is not as prone to divergence, which is a failure mode from which it cannot recover. This will enable the new method to be used more robustly with inexpensive IMUs such as those found on mobile computing devices.

One preferred method of the present invention uses a navigation system and a camera to triangulate landmarks and simultaneously estimate the position errors.

The use of feature point positions and detected pixel coordinates to calculate the position and attitude of the camera is based on previous work. However, the use of the uncertainty of feature point positions and uncertainty in pixel coordinates to calculate the uncertainty in the calculated position and attitude is new.

The method of compensating for time correlated errors in the calculated position and attitude of the camera is old work; however, the method for calculating the exact correlation in between measurements is new. Also, the loose integration method for blending of camera measurements with other sensors in an EKF is new. And, the present invention has the ability to switch in between loose and tight integration methodologies, as well as the ability to detect whether the filter is in a potentially divergent condition.

The method may be built from any combination of sensors and processors, so long as one of the sensors supplies an image. For example, the method could be used to compute a navigation solution using a camera and a compass, or just a camera alone. The microprocessor could be a field programmable gate array (FPGA), an x86 architecture microprocessor, an ARM microprocessor, a DSP microprocessor, or any other computational device that can perform the necessary computations.

The Extended Kalman Filter is used to integrate measurements from all of the different sensors. Data is collected to both characterize the sensors used, and to validate the algorithms. A method of calculating the time correlated error in between camera measurements has been implemented, as well as the known method of measurement differencing.

The loose architecture for the Extended Kalman Filter can be implemented, as well as the initial formulation of the tightly coupled camera-IMU measurement update and the ability to switch between loose and tight integrations, and of ability to detect if the tight integration is operating in a divergent mode.

Algorithms have been implemented to triangulate the position of the feature points, to estimate the uncertainty in their estimated positions, and to estimate the uncertainty in their pixel coordinates. An alternative algorithm uses landmarks to estimate the position and attitude of the camera, and to estimate the covariance of the position and attitude estimates. A method of calculating the time correlated error in between camera measurements has been implemented, as well as an existing algorithm to use landmarks to estimate the position and attitude of the camera, and to estimate the covariance of the position and attitude estimates The invention discussed here provides an improved method for determining the position, velocity and orientation of a user from images captured by camera. Unlike prior art in the area the invention discussed is capable of being implemented on inexpensive hand held devices such as mobile phones.

A computationally efficient method has been disclosed for fusing multiple sensors including a camera and an IMU to determine a GPS-free navigation solution on mobile computing devices. Also, a method has been disclosed for stringing multiple sensors efficiently into the filter that does the navigation computation.

Loose Integration of INS, GNSS and Vision-Based Navigation

Figure 6:
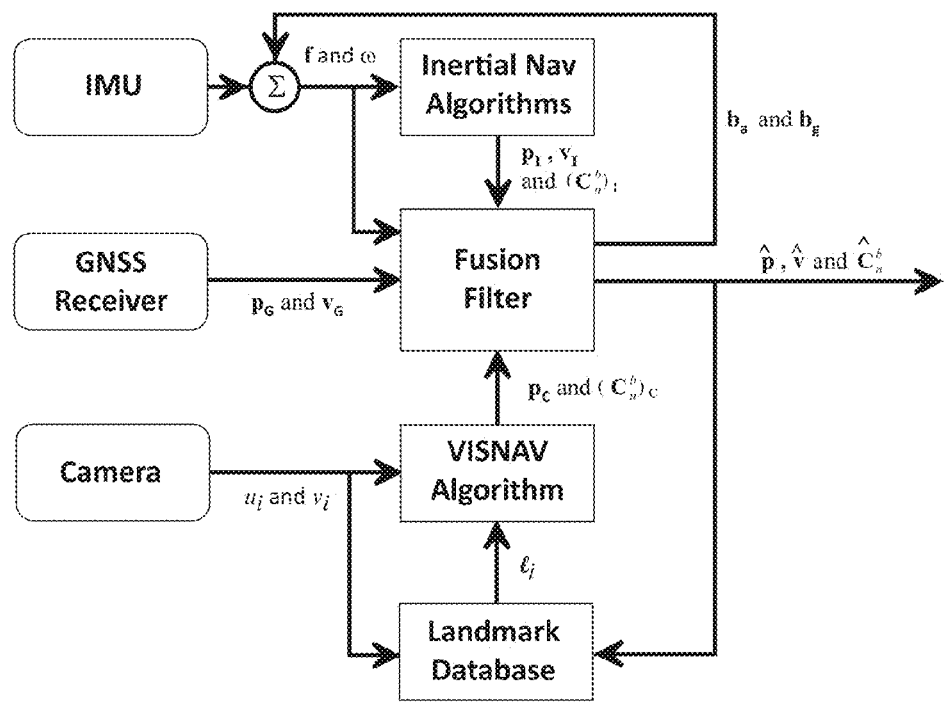
FIG. 6: System architecture for integrated INS, GNSS and VISNAV

A description of loose integration of INS, GNSS and Vision-Based Navigation will be described in conjunction with FIGS. 6-27, in which:

FIG. 6: System architecture for integrated INS, GNSS and VISNAV

Figure 7:
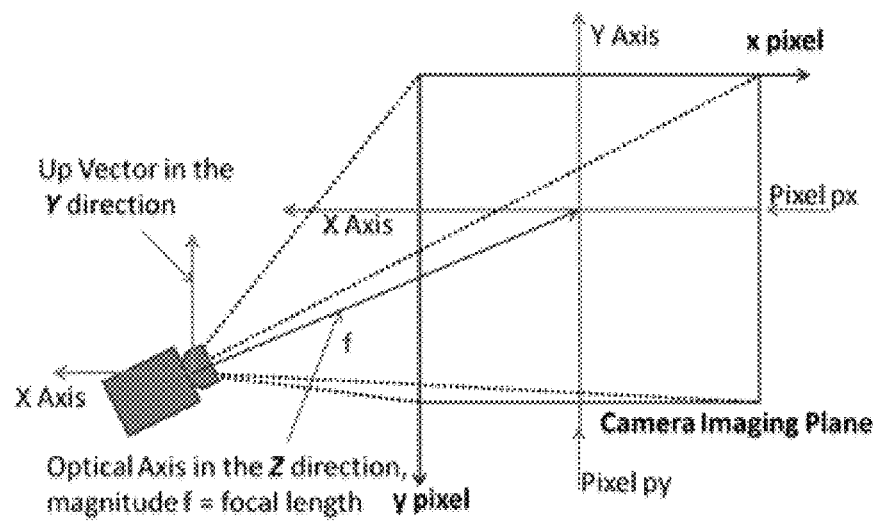
FIG. 7: The Pinhole Camera Model

FIG. 7: The Pinhole Camera Model

Figure 8:
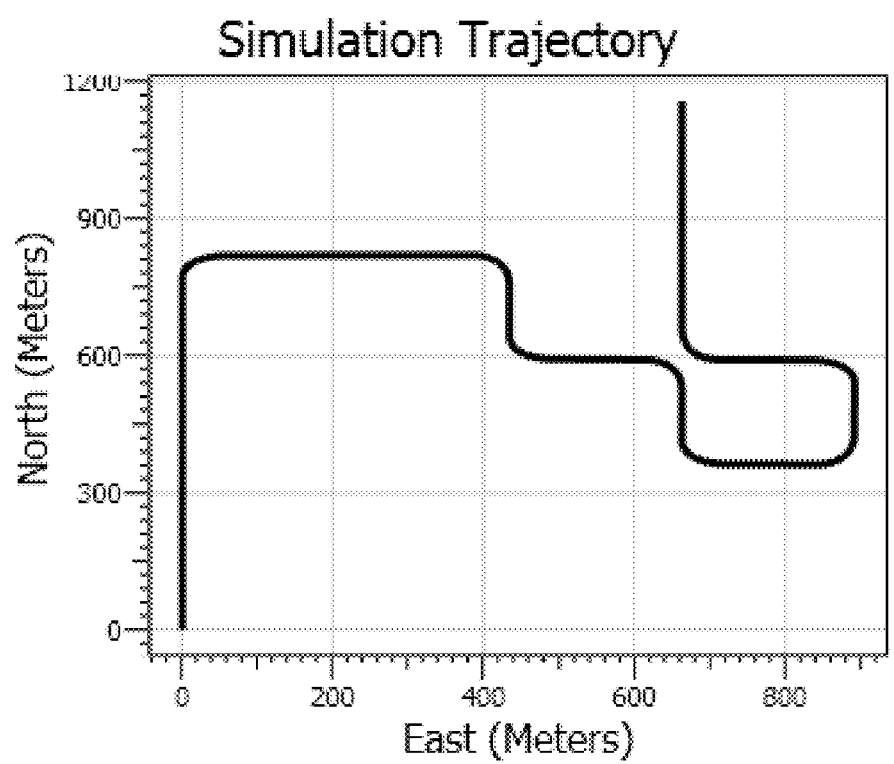
FIG. 8: Ground Track of Simulation Scenario

FIG. 8: Ground Track of Simulation Scenario

Figure 9:
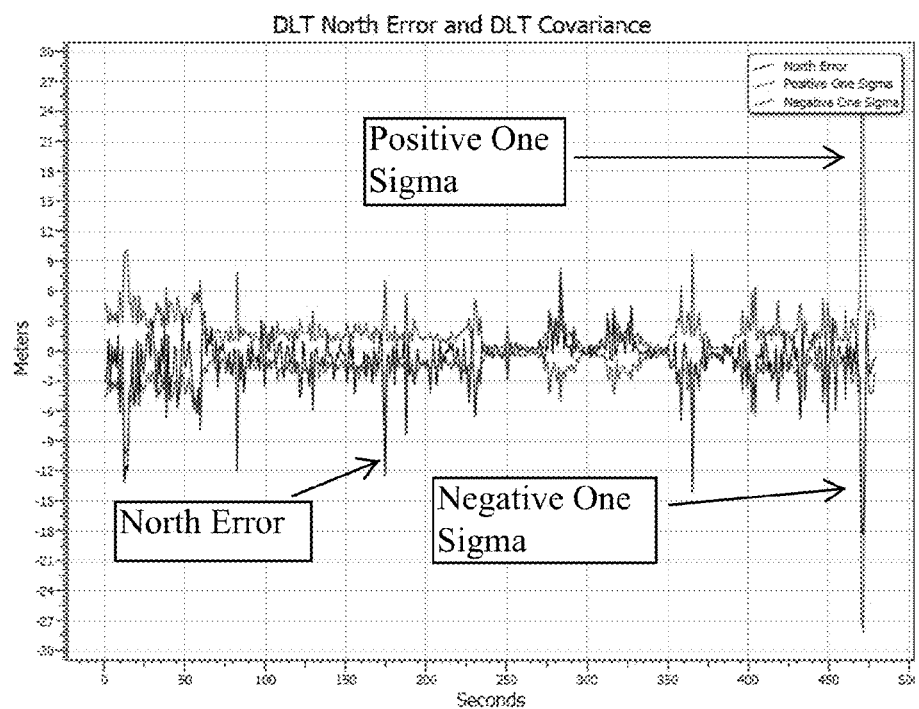
FIG. 9: VISNAV North Position Error

FIG. 9: VISNAV North Position Error

Figure 10:
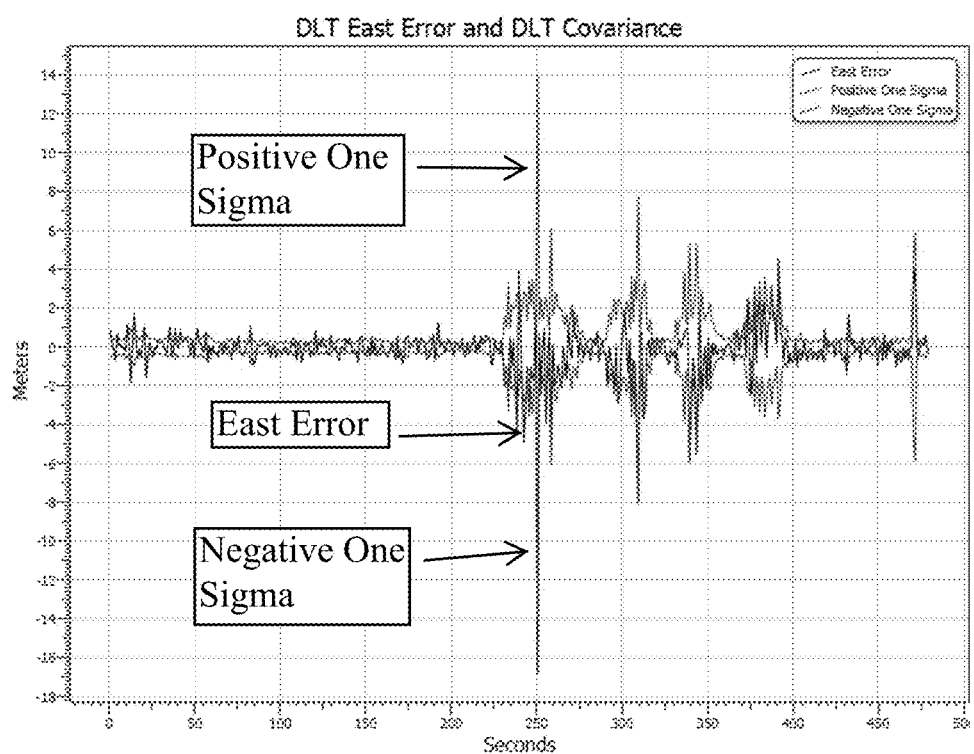
FIG. 10: VISNAV East Position Error

FIG. 10: VISNAV East Position Error

Figure 11:
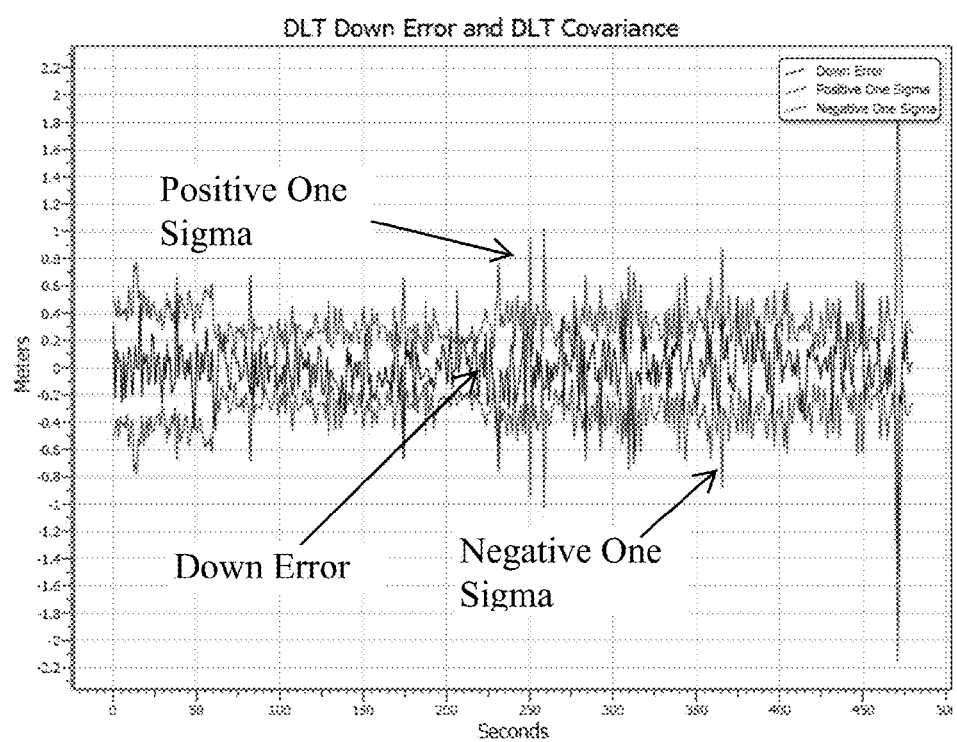
FIG. 11: VISNAV Down Position Error

FIG. 11: VISNAV Down Position Error

Figure 12:
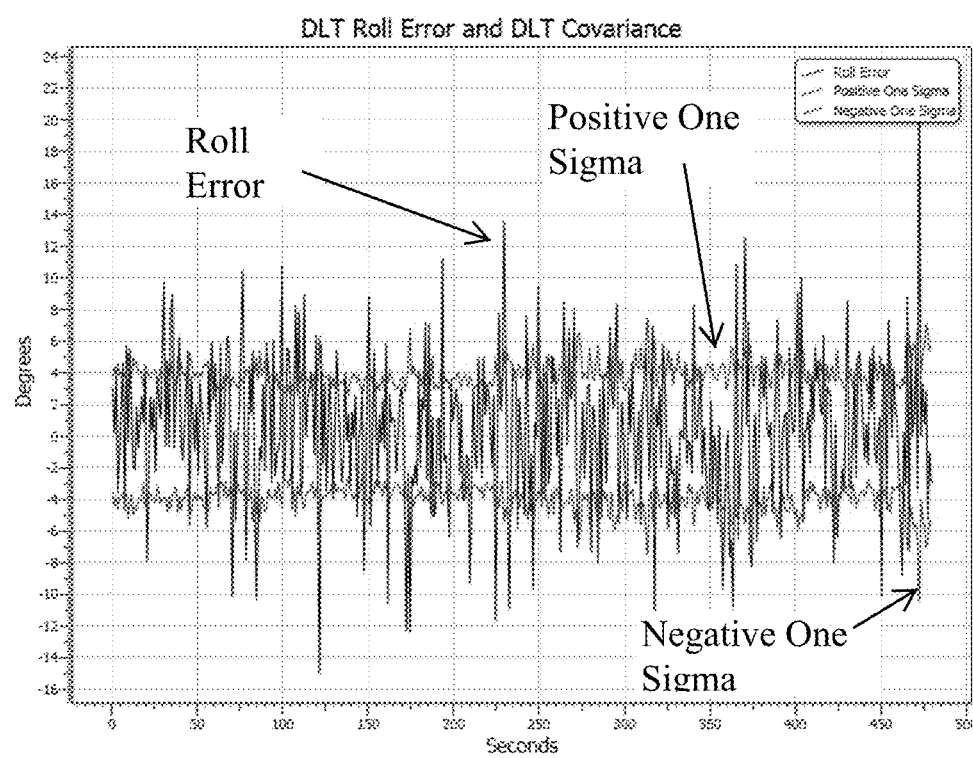
FIG. 12: VISNAV Roll Attitude Error

FIG. 12: VISNAV Roll Attitude Error

Figure 13:
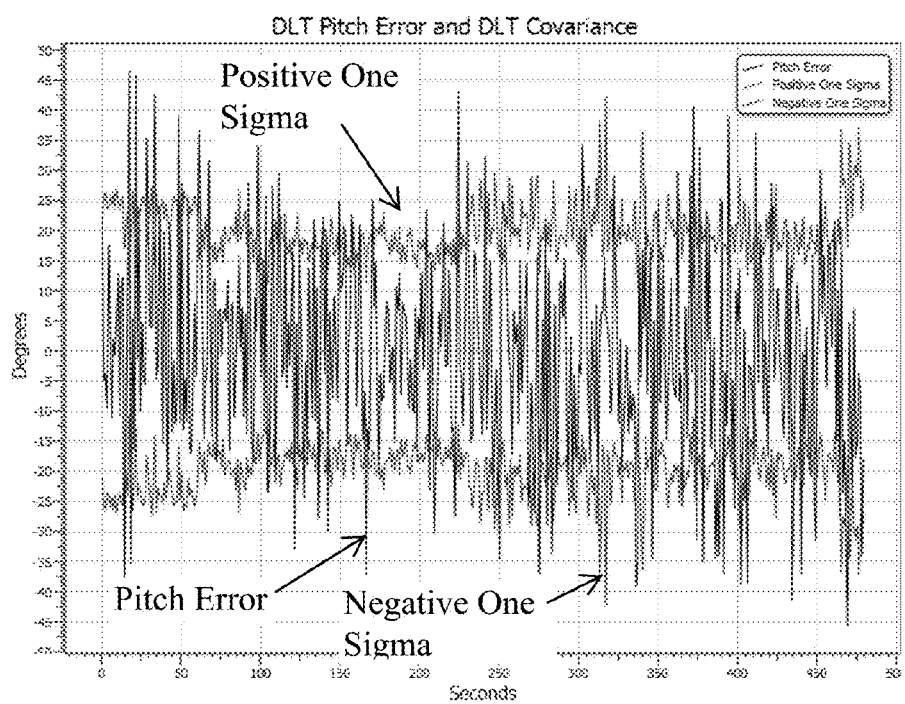
FIG. 13: VISNAV Pitch Attitude Error

FIG. 13: VISNAV Pitch Attitude Error

Figure 14:
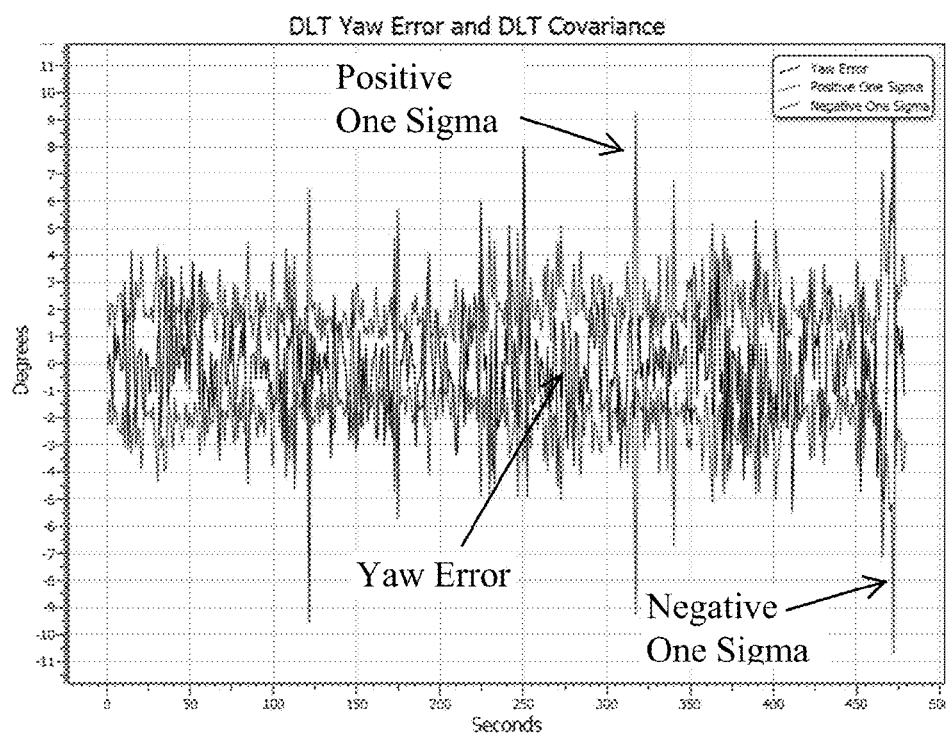
FIG. 14: VISNAV Yaw Attitude Error

FIG. 14: VISNAV Yaw Attitude Error

Figure 15:
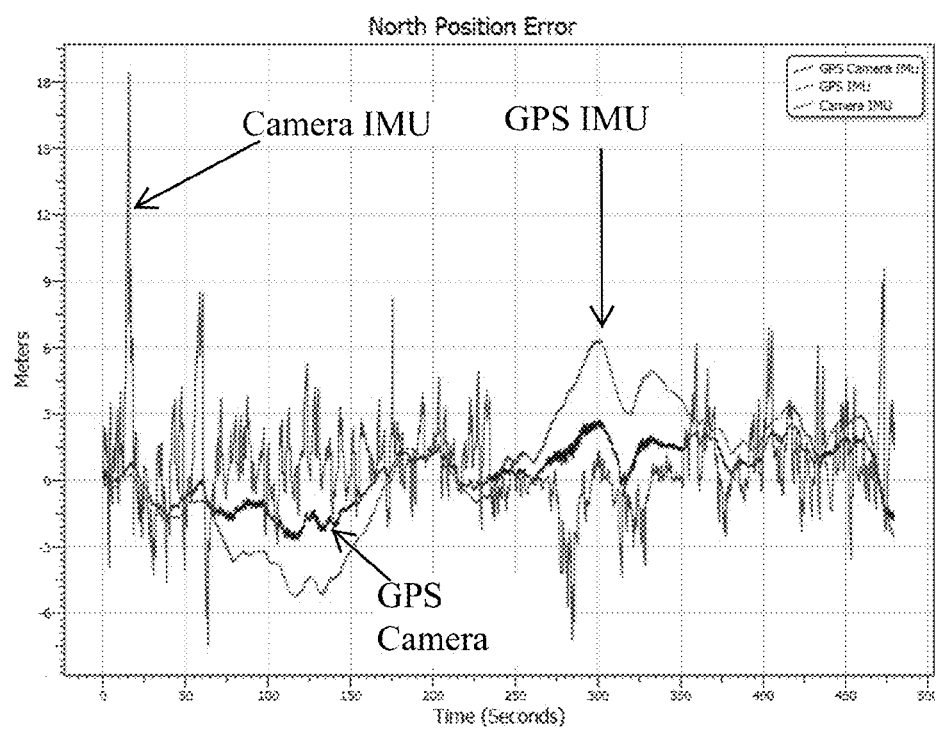
FIG. 15: Integrated Filters' North Position Error Performance (Simulation Results)

FIG. 15: Integrated Filters' North Position Error Performance (Simulation Results)

Figure 16:
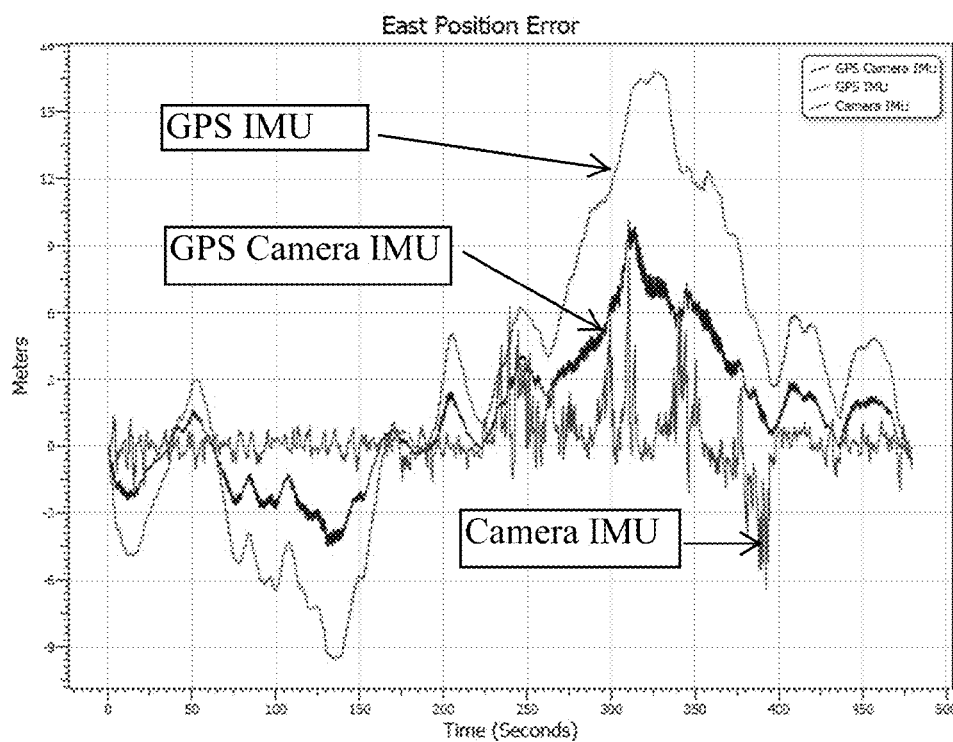
FIG. 16: Integrated Filters' East Position Error Performance (Simulation Results)

FIG. 16: Integrated Filters' East Position Error Performance (Simulation Results)

Figure 17:
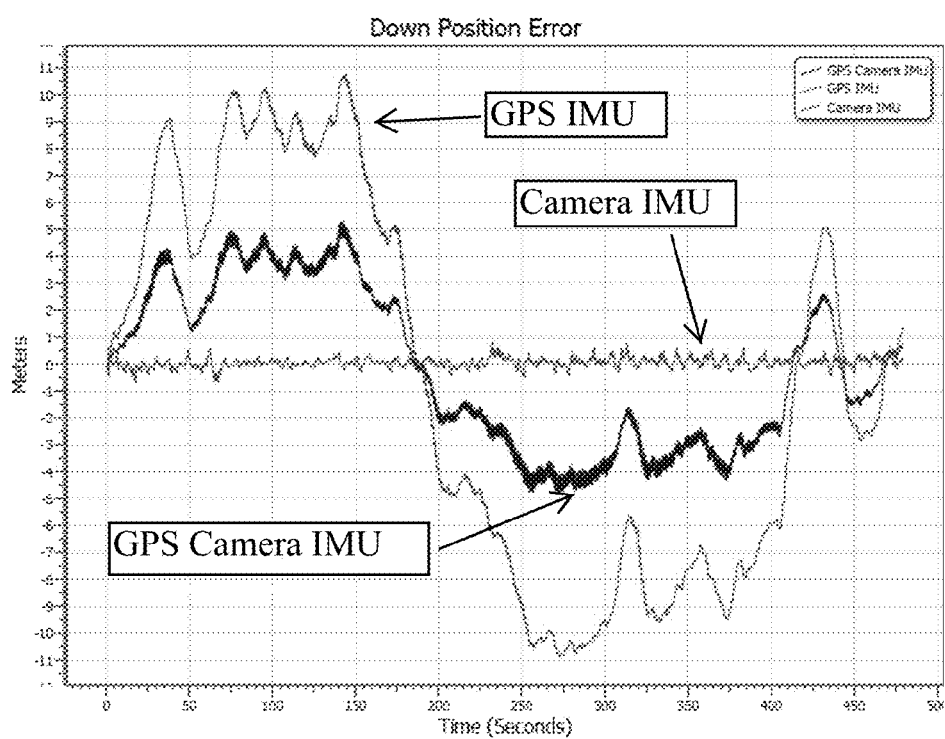
FIG. 17: Integrated Filters' Down Position Error Performance (Simulation Results)

FIG. 17: Integrated Filters' Down Position Error Performance (Simulation Results)

Figure 18:
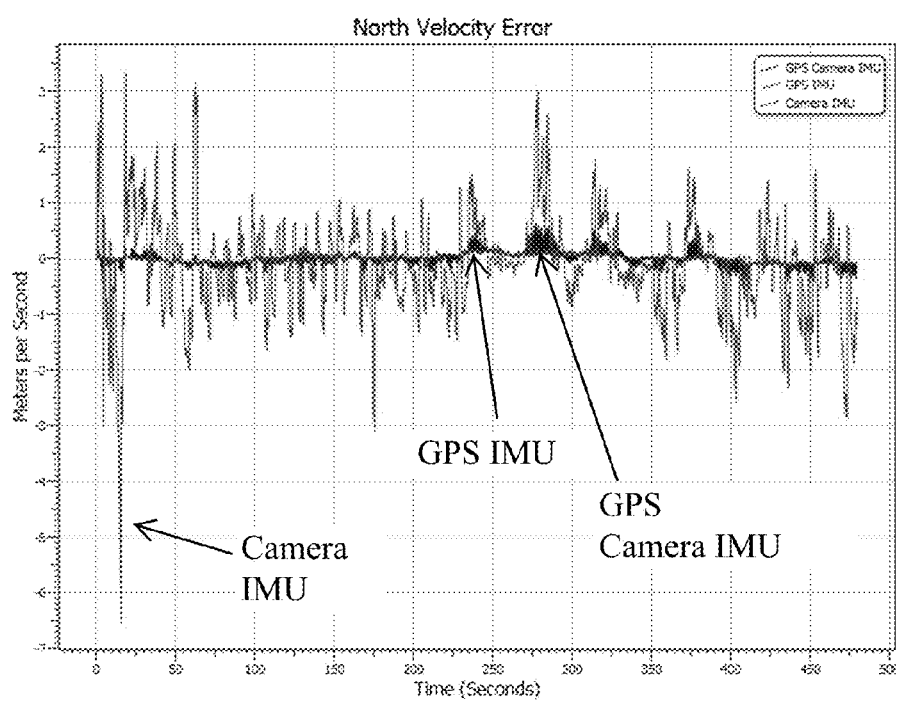
FIG. 18: Integrated Filters' North Velocity Error Performance (Simulation Results)

FIG. 18: Integrated Filters' North Velocity Error Performance (Simulation Results)

Figure 19:
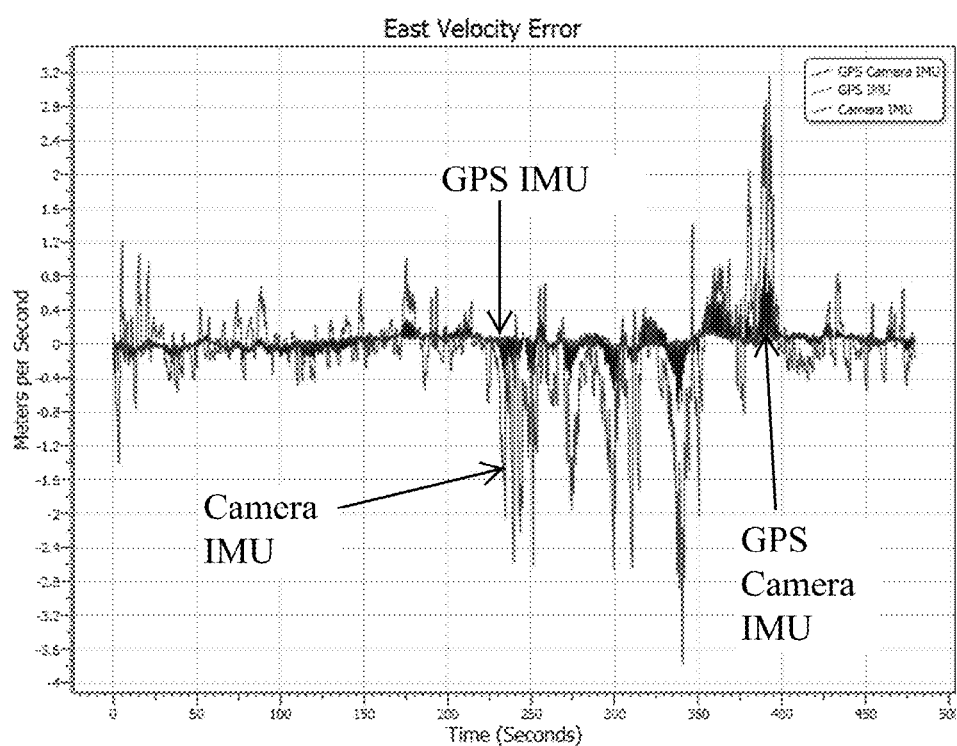
FIG. 19: Integrated Filters' East Velocity Error Performance (Simulation Results)

FIG. 19: Integrated Filters' East Velocity Error Performance (Simulation Results)

Figure 20:
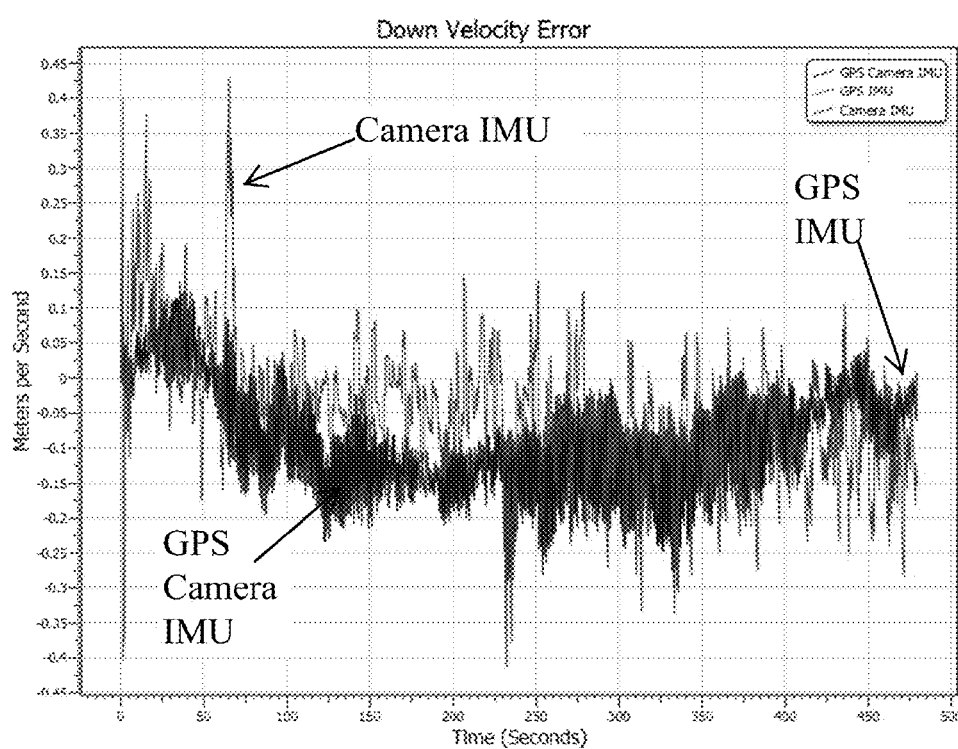
FIG. 20: Integrated Filters' Down Velocity Error Performance (Simulation Results)

FIG. 20: Integrated Filters' Down Velocity Error Performance (Simulation Results)

Figure 21:
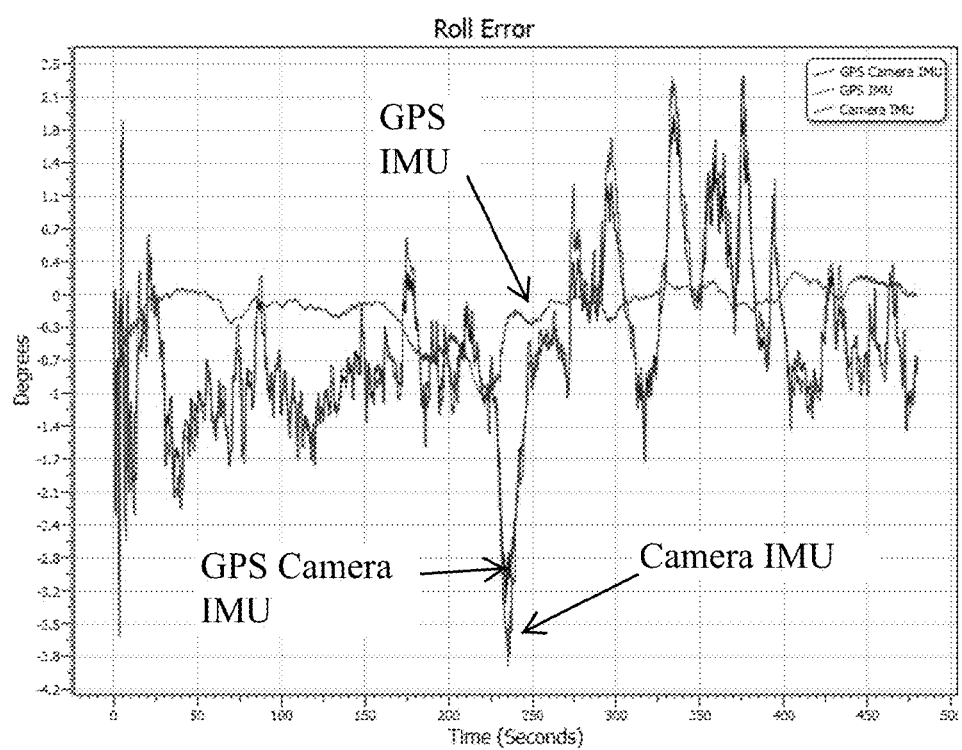
FIG. 21: Integrated Filters' Roll Attitude Error Performance (Simulation Results)

FIG. 21: Integrated Filters' Roll Attitude Error Performance (Simulation Results)

Figure 22:
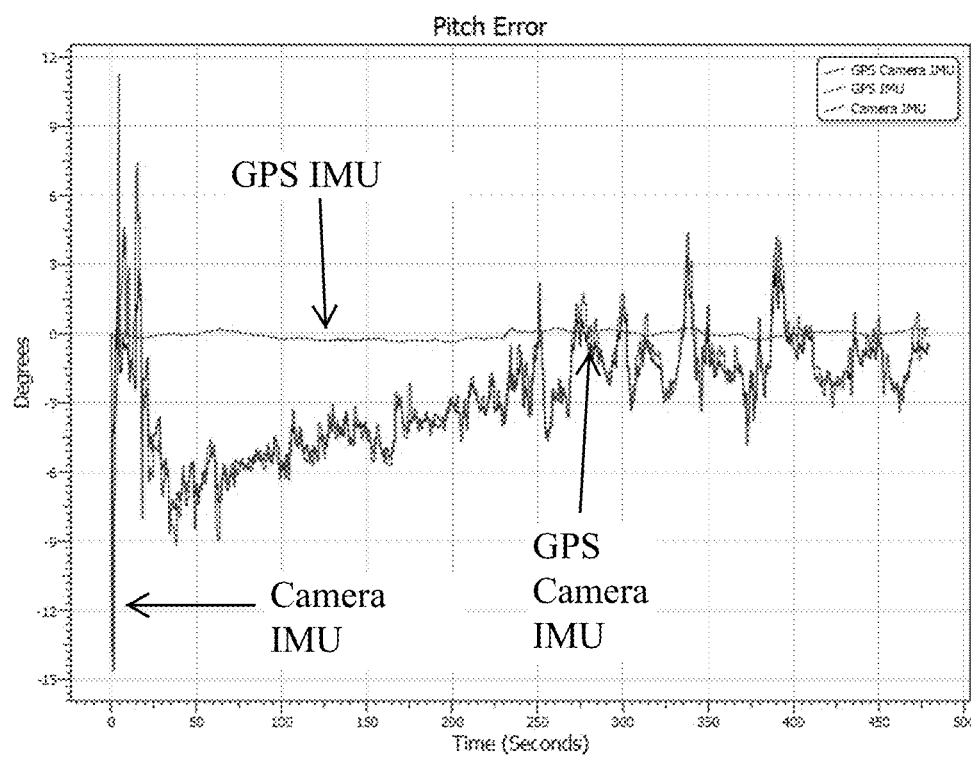
FIG. 22: Integrated Filters' Pitch Attitude Error Performance (Simulation Results)

FIG. 22: Integrated Filters' Pitch Attitude Error Performance (Simulation Results)

Figure 23:
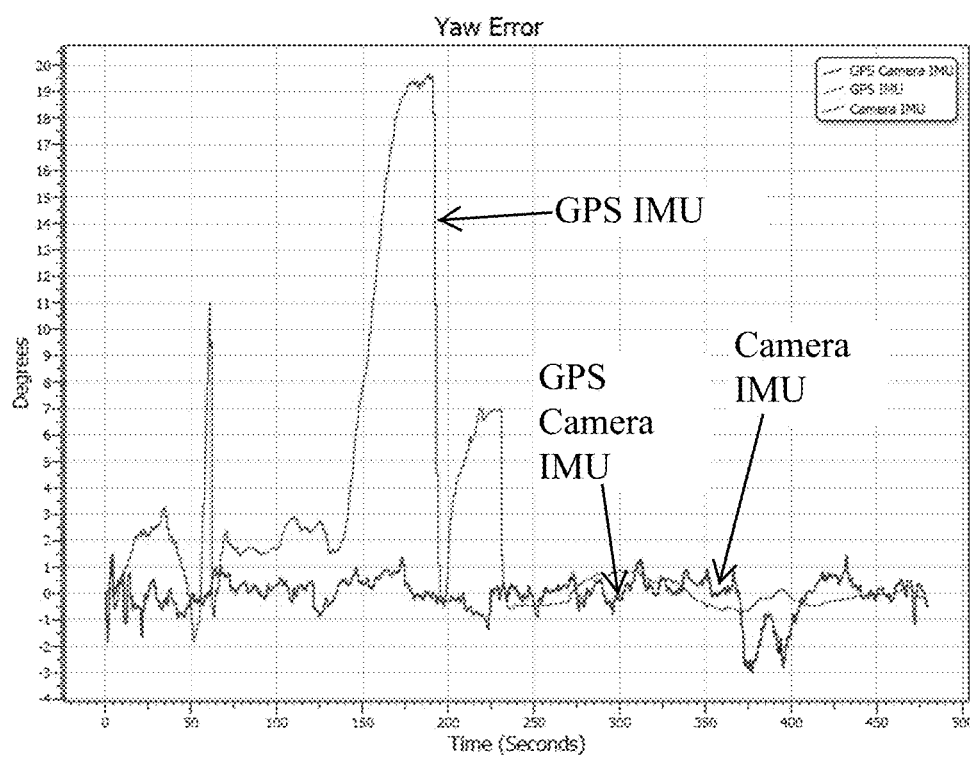
FIG. 23: Integrated Filters' Yaw Attitude Error Performance (Simulation Results)

FIG. 23: Integrated Filters' Yaw Attitude Error Performance (Simulation Results)

Figure 24:
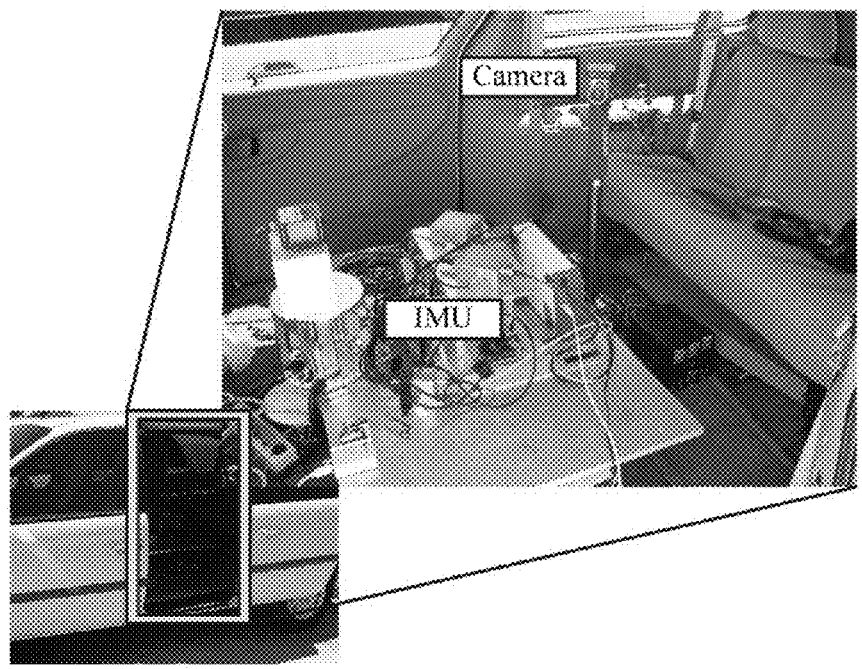
FIG. 24: Experimental Set Up. Van with IMU, Camera and other Support Equipment.

FIG. 24: Experimental Set Up. Van with IMU, Camera and other Support Equipment.

Figure 25:
FIG. 25: Ground Track from Post Processed Sensor Data Showing Performance of the Integrated INS/GPS/VISNAV Navigation System

FIG. 25: Ground Track from Post Processed Sensor Data Showing Performance of the Integrated INS/GPS/VISNAV Navigation System. The Dark (Blue) Trace is the INS/VISNAV Solution. The Lighter (Red) Trace is the INS/GPS Solution. (Experimental Results).

Figure 26:
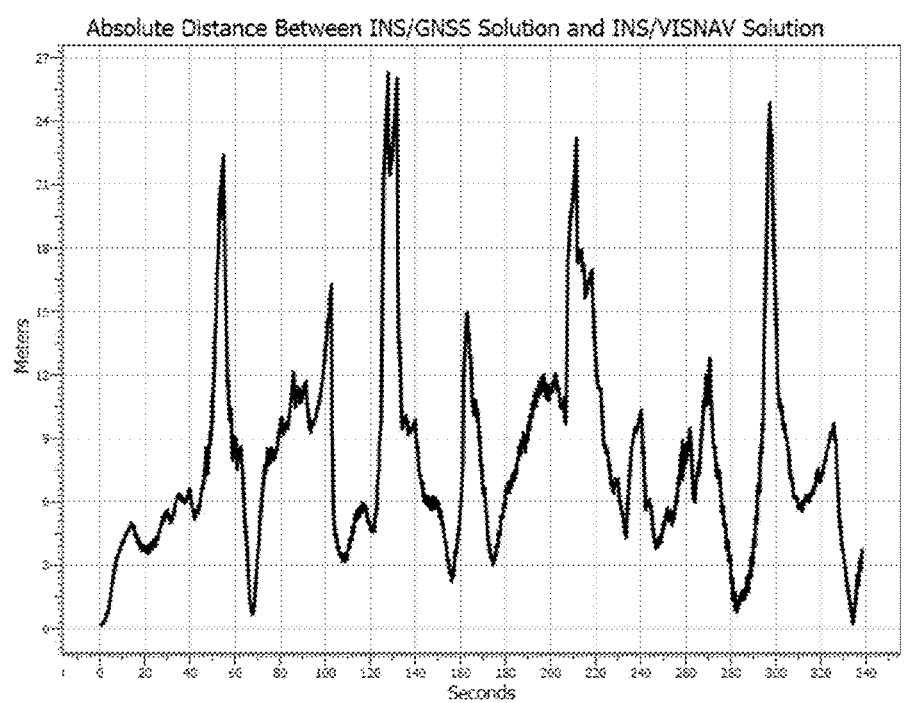
FIG. 26: INS/VISNAV Navigation Error for the Experimental Test Run, where GPS/INS Solution is used as Ground Truth.

FIG. 26: INS/VISNAV Navigation Error for the Experimental Test Run, where GPS/INS Solution is used as Ground Truth.

Figure 27:
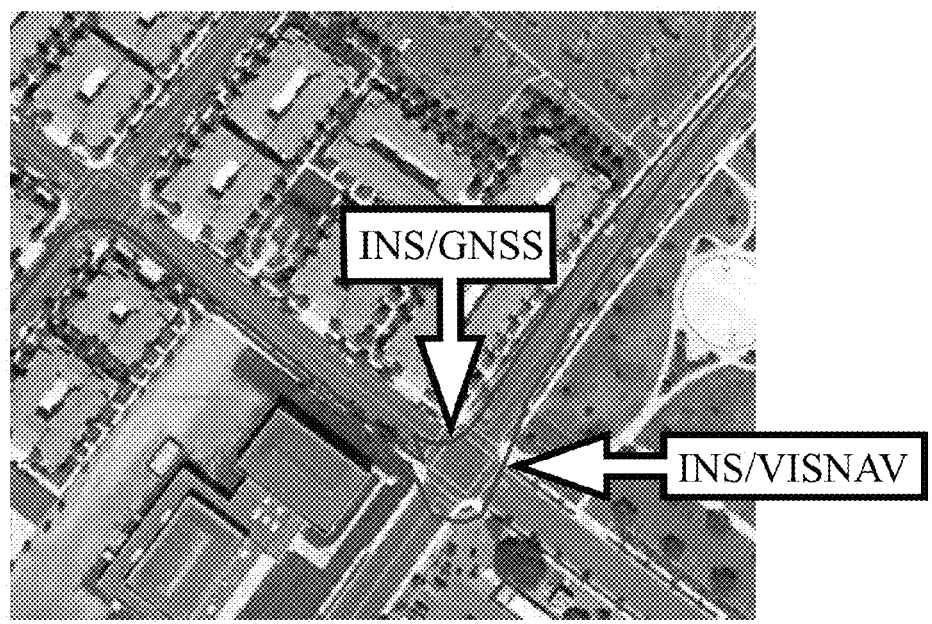
FIG. 27: Closeup of a Section of the Ground Track Shown in FIG. 20.

FIG. 27: Closeup of a Section of the Ground Track Shown in FIG. 20. The Dark (Blue) Trace is the INS/VISNAV Solution. The Lighter (Red) Trace is the INS/GPS Solution. (Experimental Results).

The design and performance of a filter for loosely integrating INS, GNSS, and a vision-based navigation (VISNAV) system is presented. The INS/VISNAV integration is loose in the sense that integration occurs at the level of position and attitude. This is in contrast to tight integration where information fusion occurs at the pixel level. While it is sub-optimal from a filtering point of view, the loose integration approach can be more robust to linearization errors which lead to solution divergence. A method for computing the covariance of position and attitude estimates of the VISNAV solution is presented. The performance of the integrated navigation system is validated via simulation studies and post-processing of experimental data. The results show that during a 5 minute 40 second GNSS outage, the integrated INS/VISNAV provides a navigation solution with a mean spherical error of 7.8 m.

| NOMENCLATURE | |
|---|---|
| Symbol | Definition |
| Lower case letters | Scalars |
| Bold face upper case letters | Matrix |
| Bold face lower case letters | Column vector |
| $I_n$ | An n × n identity matrix |
| $Z_n$ | An n × n matrix of zeros |
| $C_a^b$ | Transformation matrix from the a-frame to the b-frame |
| M | Camera intrinsic matrix |
| p | Position coordinate of the user |
| $u_i$ | Horizontal pixel-coordinate (on the imaging plane) of the $i^{th}$ feature. |
| $v_i$ | Vertical pixel-coordinate (on the imaging plane) of the $i^{th}$ feature. |
| $e_i$ | Homogenous vector of $i^{th}$ feature pixel coordinates = $[u_i\ v_i\ 1]^T$ |

-continued

NOMENCLATURE

| Symbol | Definition |
|---|---|
| $\lambda_i$ | Homogenous vector of $i^{th}$ feature position coordinates $\in \mathbb{R}^{4\times 1}$ |
| s | Scaling constant |
| $K_k$ | Kalman gain at $t = t_k$ |
| $R_k$ | Measurement (GPS or VISNAV) error covariance at $t = t_k$ |
| $P_k^+$ | State error covariance before measurement update at $t = t_k$ |
| $P_k^-$ | State error covariance after measurement update at $t = t_k$ |
| f | Specific force (accelerometer output) |
| $\omega$ | Angular rate (rate gyro output) |

1 Introduction

This paper deals with the fusion of Inertial Navigation Systems (INSs), Global Navigation Satellite Systems (GNSS) and Vision-based Navigation Systems (VISNAV). This fusion is motivated by the fact that each of these navigation systems has strengths and weakness which are complementary to strengths and weaknesses of the other two systems. For example, an INS generates a navigation solution by the continuous sensing and processing of accelerations and rotation rates of the user. The sensors used by an INS are completely self contained (i.e., do not require information obtained from sources external to the user), and, thus, their operation is immune to external interference in any terrestrial or water environment. Furthermore, the computational burden of an INS is small, so a navigation solution can be generated at a high rate. INSs provide a complete navigation solution in that they generate an estimate of a user's position, velocity and attitude. However, since an INS generates a navigation solution by using the mathematical operation of integration, any acceleration or rotation measurement errors, however slight or uncorrelated, lead to unbounded navigation errors[1].

In contrast, GNSS receivers require information from satellites to generate a navigation solution. Thus, they are not self contained and can be affected by malicious or un-intentional radio-frequency interference. Signal obstruction in urban canyons, valleys, and beneath dense foliage also limits the utility of GNSS. However, in the absence of interference and obstructions, GNSS provides a navigation solution which is unparalleled in accuracy by most other navigation systems. In conventional use, GNSS provide an estimate of a user's position and velocity only. Multiple GNSS receiver-antenna pairs can be used to generate a user's attitude estimate. The update rates of GNSS are not as high as an INS and are normally between 1 and 10 Hz [2].

VISNAV generates a navigation solution by using cameras to make line-of-sight measurements from the user relative to landmarks at known locations. The measurements allow estimation of a user's position and attitude relative to the landmarks used. Although modern CMOS imaging sensors can take photographs at rates exceeding 60 Hz, the computational burden of VISNAV will limit this rate considerably. The final update rate will be around 1 Hz, and will depend on implementation decisions, such as the type of hardware used, the image's pixel count, and the image processing algorithms selected for feature detection and matching.

The VISNAV solution is not always available in poor lighting conditions unless sensors such as infrared cameras are used. Another VISNAV challenge is associated with knowledge of the coordinates of the landmarks used to generate the navigation solution. In some instances, they are available a priori relative to a pre-established coordinate system (e.g., ECEF or geodetic coordinates), in which case we call this the absolute-VISNAV. In many instances it is not possible to have landmarks surveyed a priori and their survey has to be done in real time. This latter mode of navigation we call relative-VISNAV; like INSs, relative-VISNAV can exhibit a navigation solution which drifts with time.

In view of the above, it is clear that an integrated system fusing the three navigation systems can provide an accurate, relatively drift-free and complete navigation solution at a relatively high update rate. The purpose of this paper is to discuss the system architecture, algorithms and performance of one such system, shown in FIG. 6. We call this a loose integration architecture because the information between the three systems is integrated at the position, velocity and attitude level. This is in contrast to other integration schemes which are called "tight" or "deep" where the integration between an INS and VISNAV occurs at the specific force, angular rate and pixel level [5, 6, 7].

1.1 Motivation

An important goal in designing any integrated, multi-sensor navigation system is to develop sensor fusion algorithms which generate an optimal solution. The term "optimal solution" is normally used to mean the most accurate solution or one with the least error. In this regard, it has been shown that the tight or deep integration of VISNAV and an INS is preferable over loose[23]. This is because in the loose integration the measurement errors (error on the vision-based position and attitude estimates) may be correlated and correctly accounting for these correlations in sensor fusion algorithms is challenging and not always effective. Thus, a loose integration will yield a sub-optimal navigation solution.

When dealing with integrated navigation systems designed around low cost inertial sensors, however, a sub-optimal navigation solution may be an acceptable compromise for an estimate with increased stability and robustness. To see why this is the case, consider how an INS is integrated with VISNAV or GNSS in practice. The INS is used as the inner loop sensor which provides a navigation solution at a high rate. Periodically, when VISNAV or GNSS solutions become available they are used to reset the INS solution.

Since the mathematical equations used for integrating VISNAV or GNSS solutions with INS solutions are non-linear (i.e., a Kalman filter measurement update equation), they are linearized about the best current estimate of the navigation state, which is the INS solution. If the INS solution has become corrupted by large drift errors, linearizing about this INS estimate may lead to filter instabilities because the assumption of small errors (i.e., ignoring higher-order terms in the linearization) is violated. This can occur if the last GNSS or VISNAV update was some time ago or if the biases of the INS have changed. With the INS/GNSS integration this is not a problem as the non-linearities involved are mild; the large distances between a terrestrial user and the GNSS satellites minimize the effects of linearization errors.

With VISNAV, however, this is not the case. Depending on the geometry of the visual landmarks being used at some given epoch, the non-linearities can be severe and very sensitive to small linearization errors. In such instances, a tight integration (which requires linearization of the VISNAV equations about the current INS estimate) may become unstable. In a loose integration, however, the VISNAV solution is decoupled from the INS solution. Since the INS errors do not affect the VISNAV solution directly, the tendency of the integrated solution to diverge will be less. For the same reason, the loose integration can be more robust with respect to misidentified feature points.

It is not the claim of this paper that the loose integration of INSs/GNSS/VISNAV is a superior architecture to tight integration; from a performance point of view, loose integration is clearly sub-optimal. Rather, the tight and loose integration architectures are "bookends" of sorts at either end of the integration architecture spectrum. For integrated navigation systems built around low cost inertial sensors to be stable when the availability of high-quality and frequent visual updates is not guaranteed, it may be necessary to reconfigure the integration architecture to take advantage of the stability of the loose architecture. This paper presents how the integration at the loose end of the spectrum can be accomplished and what performance can be expected from this integration scheme.

1.2 Prior Art and Contribution

FIG. 6 provides a general overview of the system described in this paper. The VISNAV block estimates a navigation solution from the pixel coordinates of landmarks (features) generated by a calibrated camera and feature tracking algorithm. Neither the algorithm for estimating the VISNAV solution nor the feature tracker are entirely new. The feature detection and matching algorithm used in this work is Speeded Up Robust Features (SURF) [8] which allows the same feature points to be detected across multiple photographs, which may be taken from different perspectives and under different lighting conditions. In this work, the feature points that are detected corrospond to landmarks with known locations. The algorithm for estimating the position and attitude solution relies upon computing the projective transformation that relates the position of the landmarks to their detected pixel coordinates. This transformation is computed using a modified form of the Direct Linear Transformation (DLT), which has been discussed extensively in texts on computer vision such as [9] and [10].

However, prior work on estimating the covariance of the projective transformation is incomplete. A naive method for calculating the covariance of projective transforms is presented in [9] that ignores their ill-conditioned numerics and arbitrary scaling, which leads to innacurate covariance estimates. An essential, complete method for calculating the projective transform covariance estimation is presented in this paper. The final step of relating the covariance of the projective transform to the position and attitude covariance is also presented here (it was initially described in [11]).

When the same landmarks appear in multiple photographs, the measurements that are made from those photographs will have correlated error characteristics. An extension of the DLT covariance estimation is presented that derives the correlation in the measurement error. The method of measurement differcing [25] is demonstrated, which uses the derived error correlation in a modified Kalman Filter update equations that accounts for correlated measurement errors.

A popular method of using cameras in navigation is called visual Simultaneous Localization and Mapping (SLAM). A survey of the literature on SLAM is available in [3] and [4]. In SLAM based navigation, data from the camera is used to simultaneously estimate the camera pose and the position of landmarks that are used to navigate. This approach has two primary advantages over the methods that are presented in this paper. The first is that the location of the landmarks that corrospond with the feature points do not need to be known a priori; by including the landmark location in the state vector, SLAM estimates the location of the landmark on-line. The second advantage to SLAM is the ability to achieve "loop-closure" when revisiting an area. These advantages come with a cost—SLAM is more computationally complex than VISNAV.

Because landmark locations are included in the state vector, the computational complexity scales with the number of landmarks. In naive EKF-SLAM, computation increases quadratically with the number of landmarks. Another consideration for SLAM is that, although the relative location of landmarks can be determined very accurately, the absolute location of landmarks is subject to the absolute error that exists in the navigation system's pose estimate. That is, the SLAM solution for the location of all the landmarks might include some constant error with respect to their true location, which will be a function of the error in the navigation system. This is not the case for pre-surveyed points. These trade-offs must be considered when choosing to use SLAM or VISNAV. Some examples where VISNAV would be more appropriate include missile guidance and unmanned aerial vehicle (UAV) operation, where the landmarks can be pre-surveyed and loop-closure is unimportant.

The idea of integrating INSs, GNSS and VISNAV is not new and there is an extensive body of work in this area. A survey of key works in the area of integrating INSs, GNSS and VISNAV is given in [5]. Relative to the work reported in this paper, the relevant integrated INSs/GNSS/VISNAV systems are described in [5], [6], [7] and [12]. In [6] and [7], a tightly integrated (integration at the pixel level) INS/VISNAV system is presented. The INS solution in the [6] and [7] systems is based on a tactical grade IMU. The filter features feedback in that an estimate of inertial sensor output errors is generated and used to correct subsequent inertial sensor measurements. The architecture in [12] is also a tight INS/VINAV integration with tactical grade inertial sensors but uses a feed-forward formulation. In this case, the filter outputs are used to correct the navigation state vector (position, velocity and attitude) estimates of the INS.

The filter state in [12] includes the position coordinates of the landmarks being tracked by the VISNAV algorithm. The dynamics of the landmark error states are modeled as a simple random walk to prevent the Kalman gain associated with those states from going to zero. The approach in [5] is a tight integration between VISNAV and an INS. Like [6] and [7] it includes feedback of inertial sensor errors. Similar to [12] it includes the location of landmarks as states in the filter and accounts for their uncertainty in estimating the position, velocity and attitude of the user. Unlike [6]-[12], however, the architecture [5] is shown to work with both tactical and consumer/automotive grade inertial sensors.

The work in this paper can be thought of as a loosely integrated version of the filter in [5]. It uses position and attitude from VISNAV to help arrest inertial sensor drift errors as well as estimate inertial sensor errors. The integrated solution (or filter output) is, in turn, used to estimate the position coordinates of landmarks. The landmark positions, however, are not included in the state vector. Rather, the uncertainty of the landmark position and the pixel error covariance is used in the VISNAV covariance estimation algorithm to estimate the uncertainty in the position and attitude estimates that are used as the measurement in the filter. Because the integration between the INS and VISNAV is loose, the solution is sub-optimal (in the filtering sense) but more robust to linearization errors that can be problematic with tight integration using low cost (high drift) inertial sensors.

Therefore, the key contribution of the work reported in this paper is the algorithm description, performance analysis and experimental validation of a loosely integrated INS/GNSS/

VISNAV system which uses low cost inertial sensors. The inertial sensors used in the system described fall in the category of a consumer/automotive grade sensor as defined in [1] and [13]. As noted earlier in the paper, the loose integration is not being presented as an improvement to tight integration but as an alternative mode in the instances where inertial sensor drift between measurement updates is large.

1.3 Paper Organization

The remainder of the paper is organized as follows: First, the overall filter architecture is presented. The filter state vector, the time update equation and the measurement update equations for GNSS and VISNAV are described. Next, a detailed derivation of the VISNAV position, attitude, and covariance estimation algorithms is presented. This is followed by discussion of results from simulation studies showing the performance of the VISNAV covariance estimator as well as the performance of the overall integration filter. A prototype system constructed to validate the integration architecture is described and the post-process experimental results of the prototype system are presented. The paper closes with some concluding remarks and suggestions for future work.

The work in this paper is based on, and is an extension of, work initially presented in [11] and [23].

2 System and Software Architecture

FIG. 6 is a schematic of the system used to integrate a camera with an IMU and GNSS. The output of the IMU is specific force, $f^b$ and angular rate $\omega^b$ in the body coordinates. The standard inertial navigation equations [1, 13] are used to form estimates of the current navigation state. A GPS receiver and a camera are used to directly measure the navigation state, and these measurements are input in the fusion filter to produce estimates of the IMU biases and the error in the INS estimate of the navigation state. The outputs of the GNSS receiver are position estimates in geodetic coordinates and velocity estimates in local navigation coordinates.

The outputs of the camera and feature tracker are the pixel coordinates of the $i^{th}$ landmark, $u_i$ and $v_i$. The $u_i$ and $v_i$ pixel coordinates and the locations of the $i^{th}$ landmark is used in VISNAV to generate a camera-based position and attitude estimate. The attitude output by VISNAV is direction cosine matrix $C_n^b$ which is subsequently converted into Euler angles. The "n" and "b" sub- and superscripts refer to the navigation and body frames, respectively. The information from all three sensors is fed into the fusion filter which is an Extended Kalman Filter (EKF). A discussion of the EKF state vector, the inertial navigation equations, and the EKF time and measurement update equations are discussed below.

2.1 State Vector

The navigation state, x, consists of position, velocity, attitude and IMU sensor bias states. More precisely $$x^T = [(p^n)^T (v^n)^T (\alpha^n)^T (b_f)^T (b_g)^T] \tag{1}$$

The first entry in the navigation state is the user's position. For the work reported in this paper, the geodetic coordinates of latitude, longitude and altitude are used. The second entry in the state vector is the user's velocity expressed in North, East and Down coordinates. The third entry is the user's attitude or orientation of the user's body frame relative to the North-East-Down axes centered at the current position of the user. For the work reported here, these are the 3-2-1 Euler angle sequence of roll ($\Phi$), pitch ($\theta$) and yaw ($\psi$). The fourth entry is a vector of accelerometer output errors or biases. These biases are modeled as a constant offset (null-shift) plus a time varying component described as first order Gauss-Markov process [13]. The fifth entry is a vector of gyro biases. Similar to the accelerometer biases, these are modeled as a null-shift plus a time varying Gauss-Markov component.

The EKF is forming estimates of the error in the current INS estimate of x, which leads to an EKF state vector that is the perturbation of x, or $\delta x$:

$$\delta x^T = [(\delta p^n)^T (\delta v^n)^T (\delta \alpha^n)^T (\delta b_f)^T (\delta b_g)^T] \tag{2}$$

Although $p^n$ is geodetic coordinates, $\delta p$ is position error in NED coordinates. This will be discussed in more detail in the measurement update equation below. The vector $\delta \alpha$ represents the attitude errors and is explicitly given as:

$$\delta \alpha^n = \begin{bmatrix} \delta \alpha_N \\ \delta \alpha_E \\ \delta \alpha_D \end{bmatrix} \tag{3}$$

The three angles $\delta \alpha_N$, $\delta \alpha_E$ and $\delta \alpha_D$ are small rotations about the North, East and Down axes, respectively.

2.2 Inertial Navigation Equations and Time Update Equations

The inertial navigation equations are used to integrate the specific forces, $f^b$ and angular rates $\omega^b$ to produce the INS estimate of x. [1, 13] derives them and shows how they are used to form the system transition equations for $\delta x$. The system transition equation for $\delta x$ from step k−1 to step k is:

$$\delta x_k = \Phi_k \delta x_{k-1} + v_{ins,k-1} \tag{4}$$

where the process noise vector $v_{ins}$ has a covariance matrix $R_{ins}$.

2.3 Measurement Update Equations

Since measurements come from two separate sources (GNSS and VISNAV), the filter features two measurement equations. The first of these is used when GNSS updates are available. The second one is used when VISNAV updates are available.

2.3.1 GNSS Update

In the case of GNSS updates, the measurement updates follow the standard loose INS/GNSS integration discussed in [1, 13].

2.3.2 VISNAV Update

The visual navigation measurement at time $t = t_k$ is:

$$\delta y_v = H_v \delta x + \varepsilon_k \tag{5}$$

$$= \begin{bmatrix} \delta p^n \\ \delta \alpha^n \end{bmatrix} \tag{6}$$

where the subscript v refers to VISNAV and $\epsilon_k$ is the error associated with the camera measurement. The vector $\delta p^n$ is the position error or the difference between the position solution as predicted using the inertial navigation equations and the camera's estimate of position. The superscript n indicates that it is expressed in NED coordinates centered at the current best estimate of the vehicle's position. The attitude error vector $\delta \alpha$ is determine by first carrying out the following matrix operation:

$$C_{n'}^n = (C_b^n)_v (C_b^{n'})_{INS}^T \tag{7}$$

where n' denotes the erroneous navigation frame that results from IMU errors, and $C_{n'}^n$ is the transformation matrix that rotates the erroneous n' frame into the correct navigation frame n. Then $\delta \alpha_N$, $\delta \alpha_E$ and $\delta \alpha_D$ are extracted from $C_{n'}^n$ by:

$$\delta\alpha_N = \tan^{-1}\left(\frac{C_{n'}^n(2,3)}{C_{n'}^n(3,3)}\right) \quad (8)$$

$$\delta\alpha_E = -\sin^{-1}(C_{n'}^n(1,3)) \quad (9)$$

$$\delta\alpha_D = \tan^{-1}\left(\frac{C_{n'}^n(1,2)}{C_{n'}^n(1,1)}\right) \quad (10)$$

where $\zeta_k$ is a zero mean Gaussian error vector. The VISNAV measurement matrix $H_v$ is given by:

$$H_v = \begin{bmatrix} I_3 & Z_3 & Z_3 & Z_3 & Z_3 \\ Z_3 & Z_3 & I_3 & Z_3 & Z_3 \end{bmatrix} \quad (11)$$

The VISNAV measurement noise vector $\epsilon_v$ represents the position and attitude errors. Its covariance matrix $R_\epsilon$ is a partitioned matrix defined as:

$$R_s = \varepsilon\{\varepsilon\varepsilon^T\} = \begin{bmatrix} P_p & P_{p\alpha} \\ P_{p\alpha} & P_\alpha \end{bmatrix} \quad (12)$$

Where $P_p$, $P_\alpha$ are the respective covariance of the VISNAV position and attitude solution errors, while $P_{p\alpha}$ is their correlation. If the same landmarks are visible at step k and step k−1, the camera measurement's error at step k will be correlated with the camera measurement's error at step k−1:

$$\epsilon_k = \Psi_k \epsilon_{k-1} + v_{v,k} \quad (13)$$

$$R_{\epsilon,k} = \Psi_k R_{\epsilon,k-1} \Psi_k^T + R_{v,k} \quad (14)$$

where $v_v$ is a zero mean Gaussian variable with the covariance matrix $R_v$. The method for calculating $R_\epsilon$ and $\Psi$ are given in the next section. Because the VISNAV update may contain time correlated errors, the method of measurement differencing is used. Following the derivation in [25], the following auxiliary signals are defined:

$$\delta y'_{v,k} = \delta y_{v,k+1} - \Psi_k \delta y_{v,k} \quad (15)$$

$$= H'_v \delta x_k + v'_{ins,k} \quad (16)$$

$$H'_{v,k} = H_v \Phi_k - \Psi_k H_v \quad (17)$$

$$v'_{ins,k} = H_v v_{ins,k} + v_{v,k} \quad (18)$$

When a new measurement arrives, a single step smoothing operation is performed:

$$\delta x_{v,k-1} = \delta x_{v,k-1} + K_k(\delta y'_{v,k} - H'_v \delta x_{v,k-1}) \quad (19)$$

$$P_{k-1}^+ = (I_{15} - K_k H'_v) P_{k-1}^+ (I_{15} - K_k H'_v)^T + K_k R_v K_k^T \quad (20)$$

$$K_k = P_{k-1}(H'_{v,k})^T [H'_{v,k} P_{k-1}(H'_{v,k})^T + R_{s,k}]^{-1} \quad (21)$$

and the new visnav measurement is applied:

$$\delta x_{v,k} = \Phi_k \delta x_{v,k-1} + C_k(\delta y'_{v,k} - H'_v \delta x_{v,k-1}) \quad (22)$$

$$C_k = R_{ins} H_v^T [H'_{v,k} P_{k-1}(H'_{v,k})^T + R_v]^{-1} \quad (23)$$

$$P_k^+ = \Phi_k P_{k-1}^+ \Phi_k^T + R_{ins} - C_k(R_{ins} H_v^T)^T - \Phi_k K_k (R_{ins} H_v^T) \\ - R_{ins} H_v^T K_k^T \Phi_k^T \quad (24)$$

A brief discussion of the calculation of $\Phi$ is in order. The rate at which the INS updates the estimate of x is much higher than the frequency of VISNAV updates, so $\Phi_k$ will be the product of all of $\Phi$'s that are used to propagate the covariance of $\delta x$ in between step k−1 and step k:

$$\Phi_k = \pi_{t=t_{k-1}}^{t=t_k} \Phi_t \quad (25)$$

In the event that one or more GNSS updates occur in between VISNAV updates, $\Phi$ is propagated as:

$$\Phi^+ = (I_{15} - k_g H_g) \Phi^- \quad (26)$$

where the $K_g$ is the Kalman gain for the GNSS update and $H_g$ is the GNSS measurement equation. With the Extended Kalman Filter equations defined, the next step is to derive the covariance matrix $R_\epsilon$ and the noise correlation matrix $\Psi$.

3 VISNAV Measurement and Covariance

This section presents the details of how to estimate the camera's position $(p'')_v$, it's attitude $(C_b'')_v$, and the measurement covariance matrix $R_\epsilon$ defined earlier. $R_\epsilon$ is a function of $(p'')_v$ and $(C_b'')_v$, and of measurement errors. In the following sections the input parameters and error sources are introduced, and it is shown how the inputs are used to generate estimates of $(p'')_v$ and $(C_b'')_v$. Then the error sources are used to derive an estimate for $R_\epsilon$ and $\Psi$. A Monte Carlo analysis of the covariance estimation algorithm is performed, which reveals that failure modes may occur that produce non-Gaussian attitude and position errors. Methodology is introduced for detecting the failure modes, which allows $R_\epsilon$ to be consistently estimated in a robust fashion.

3.1 Input Error Sources

VISNAV position and attitude errors arise from several sources. Misalignment in between the axes of the camera and the axes of the INS, errors in the camera calibration parameters, errors in the position coordinates of the $i^{th}$ landmark and errors in registering its pixel location on the imaging plane (i.e., errors in $u_i$ and $v_i$) will all contribute to errors in the final position and attitude. In the derivation that follows, the camera alignment and the camera calibration are assumed to be perfect. This is not unreasonable, since these error sources may be minimized through careful calibration. That leaves the landmark survey error and the pixel registration error, which will be described here.

The pixel registration error covariance matrix captures the magnitude and nature of the pixel registration error. The pixel registration errors are defined as the difference between the actual pixel coordinates of a feature or landmark on the image plane and the pixel location reported by the camera and feature detection algorithm. Mathematically, this can be written as:

$$\begin{bmatrix} \delta u_t \\ \delta v_t \end{bmatrix} = \begin{bmatrix} \hat{u}_t - u_t \\ \hat{v}_t - v_t \end{bmatrix} \quad (27)$$

Note that $\hat{u}_t$ and $\hat{v}_t$ and are measured quantities and their error-free counterparts are $u_t$ and $v_t$, respectively. The mean of the measured pixel coordinates are $u_i$ and $v_i$, and the pixel registration errors are modelled as independent, zero-mean random variables that are uncorrelated with respect to time. Now we can define a covariance matrix for the errors associated with the registration of the $i^{th}$ landmark at times $t=t_j$ and $t=t_k$ as:

$$\varepsilon\left\{\begin{bmatrix} \delta u_{tj} \\ \delta v_{tj} \end{bmatrix} \begin{bmatrix} \delta u_{tk} & \delta v_{tk} \end{bmatrix}\right\} = \\ \delta_{jk} \begin{bmatrix} \varepsilon\{(\hat{u}_t - u_t)^2\} & \varepsilon\{(\hat{u}_t - u_t)(\hat{v}_t - v_t)\} \\ \varepsilon\{(\hat{u}_t - u_t)(\hat{v}_t - v_t)\} & \varepsilon\{(\hat{v}_t - v_t)^2\} \end{bmatrix} \quad (28)$$

-continued $$= \delta_{jk} \begin{bmatrix} \sigma_{v_t}^2 & \sigma_{u_t v_t} \\ \sigma_{u_t v_t} & \sigma_{u_t}^2 \end{bmatrix} \quad (29)$$

where $\epsilon$ is the expectation operator and $\delta_{jk}$ is the Kronecker delta function. The diagonal entries are the variances of the pixel registration errors. The off-diagonal terms are a measure of the correlation between the errors in $u_t$ and $v_t$. Landmark registration errors are also modelled as independent, zero-mean random variables, but their error is constant with respect to time. A similar derivation then leads to the definition for the landmark survey error covariance matrix of the $i^{th}$ landmark at times $t=t_j$ and $t=t_k$:

$$\varepsilon \left\{ \begin{bmatrix} \delta X_{t,j} \\ \delta Y_{t,j} \\ \delta Z_{t,j} \end{bmatrix} [\delta X_{t,k} \ \delta Y_{t,k} \ \delta Z_{t,k}] \right\} = \begin{bmatrix} \sigma_{X_t}^2 & \sigma_{X_t Y_t} & \sigma_{X_t Z_t} \\ \sigma_{X_t Y_t} & \sigma_{Y_t}^2 & \sigma_{Y_t Z_t} \\ \sigma_{X_t Z_t} & \sigma_{Y_t Z_t} & \sigma_{Z_t}^2 \end{bmatrix} \quad (30)$$

The landmark registration and pixel survey errors are assumed to be independent:

$$\epsilon\{[\delta X_{i,j} \ \delta Y_{i,j} \ \delta Z_{i,j}]^T [\delta u_{i,j} \ \delta v_{i,j}]\} = Z_{3\times 2} \quad (31)$$

With the input errors introduced, the following sections will develop a mathematical relationship between the entries of Equation 29 and Equation 30 (input errors) and the uncertainty in the VISNAV position and attitude solutions (output errors). To this end, the VISNAV algorithm that generates estimates of $p^n$ and $C_n^b$ must be described.

3.2 VISNAV Algorithm

The camera based navigation algorithm in this paper produces a measurement of position and attitude as well as their associated, time-varying covariances. This section will describe how the camera is modeled as well as how it produces measurements of attitude and position. This section follows the derivation presented in [9], except that it introduces a rigorous method of relating the arbitrary scaling of the projective transform to Euclidean geometries. It is represented here in order to provide a foundation for the subsequent covariance derivation.

3.2.1 Pin-hole Camera Model

The VISNAV equations use a pin-hole camera model as shown in FIG. 7. To see how this is done, denote the homogeneous position coordinates of the $i^{th}$ landmark as $\lambda_t^n = [X_t \ Y_t \ Z_t \ 1]^T$ where $X_t$, $Y_t$ and $Z_t$ are its cartesian position coordinates. The superscript n indicates that this landmark is expressed in the navigation frame which in our work is either the Earth Centered Earth Fixed (ECEF) or North-East-Down (NED) frames [1]. This landmark appears as a pixel at coordinates $u_t$ and $v_t$ on the camera's imaging plane. The homogeneous vector representation of the pixel coordinates in a frame attached to the camera imaging plane will be written as $e_t^c = [s_t u_t \ s_t v_t \ s_t]^T$ where $s_t$ is an arbitrary scaling constant [9, 10]. The superscript c is used to indicate the camera frame. For clarity and without a loss of generality, in the derivation that follows, it is assumed that the body frame is the same as the camera frame and, thus, $e_t^b = e_t^c$ where the superscript b indicates the body frame. If the body frame is not coincident with the camera frame but the transformation matrix between the body and the camera frame $C_b^c$ is known (which is the case in many applications), only a trivial modification to the algorithm presented is required.

The projective transform that relates $\lambda_t^n$ and $e_t^b$ involves the the navigation states of interest ($C_n^b$ and $p^n$) and is given by:

$$e_i = [MC_n^b | -MC_n^b p^n]\lambda_t \quad (32)$$

$$= H\lambda_t \quad (33)$$

$$= [H_1 \ H_2]\lambda_t \quad (34)$$

where H is a partitioned matrix with $H_1 = MC_n^b$ and $H_2 = -MC_n^b p^n$. The matrix M is called the camera intrinsics matrix. Its elements are the camera intrinsics which govern the way that Euclidean points are projected onto the camera's imaging plane. Relative to FIG. 7, the camera intrinsics are: $f_x$ or the camera focal length in the camera body x dimension; $f_y$ or the camera focal length in the camera body y dimension; $p_x$ or the principal point of the camera in the camera body x dimension (the x pixel coordinate of the point where the camera optical axis intersects the camera imaging plane); and $p_y$ or the principal point of the camera in the camera body y dimension (the y pixel coordinate of the point where the camera optical axis intersects the camera imaging plane).

$$M = \begin{bmatrix} f_x & 0 & p_x \\ 0 & f_y & p_y \\ 0 & 0 & 1 \end{bmatrix} \quad (35)$$

For the work in this paper, the camera is assumed to be calibrated and, thus, M is known.

3.2.2 Direct Linear Transform

The algorithm that is used to estimate the projective transform H is called the Direct Linear Transformation (DLT). Once the entries of the matrix H are estimated, the direction cosine matrix $C_n^b$ and camera position vector $p^n$ can be extracted. To do this, H is "vectorized" by defining $$\eta = [h_{11} \ h_{12} \ h_{13} \ h_{14} \ h_{21} \ldots h_{34}]^T \quad (36)$$

where $h_{ij}$ is the element in the $i^{th}$ row and $j^{th}$ column of H. Since $e_i$ and $H\lambda_i$ are colinear vectors, their cross product is zero. Using Equation 34, this yields the following linear equation in $\eta$:

$$0 = \begin{bmatrix} Z_{1\times 4} & -\lambda_t^T & v_t \lambda_t^T \\ \lambda_t^T & Z_{1\times 4} & -u_t \lambda_t^T \end{bmatrix} \begin{bmatrix} h_{11} \\ h_{12} \\ \vdots \\ h_{34} \end{bmatrix} = B_t \eta \quad (37)$$

Given N landmarks and their associated pixel coordinates, N of the $B_t$ matrices are stacked to construct the following linear equation in $\eta$:

$$0 = \begin{bmatrix} B_1 \\ B_2 \\ B_3 \\ \vdots \\ B_N \end{bmatrix} \eta = B\eta \quad (38)$$

The matrix $B \in \mathbb{R}^{2N \times 12}$ where N is the number of feature points. If the information used to construct B (i.e. landmark position coordinates and their associated pixel coordinates on the image plane) is error-free, then rank(B)<12 and $\eta$ would lie in the null space of B. However, in the presence of landmark and pixel errors one can only form an approximation to B which will be full rank. This full rank version of B formed using error-corrupted landmark and pixel coordinates is denoted as $\tilde{B}$:

$$\tilde{B}\eta = (B + \Delta B)\eta \neq 0 \quad (39)$$

If the vector $\hat{\eta}$ is desired to be the optimal estimate of $\eta$ in the least squares sense, one can calculate $\hat{\eta}$ (where "$\wedge$" indicates an estimate) using total least squares (TLS) [18, 19] to minimize the following cost function:

$$\min_{\eta, \Delta B} \|(B + \Delta B)\eta\| \quad (40)$$

The total least squares solution to this minimization problem involves performing a singular value decomposition (SVD) of $\tilde{B} = \tilde{U}\tilde{\Sigma}\tilde{V}^T$ where:

$$\tilde{B} = \tilde{U}\tilde{\Sigma}\tilde{V}^T = \quad (41)$$

$$[\tilde{u}_1 \ \tilde{u}_2 \ \ldots \ \tilde{u}_{12}] \begin{bmatrix} \tilde{\sigma}_1 & 0 & \ldots & 0 \\ 0 & \tilde{\sigma}_2 & \ldots & 0 \\ \vdots & \vdots & \ddots & \vdots \\ 0 & 0 & \ldots & \tilde{\sigma}_{12} \end{bmatrix} [\tilde{v}_1 \ \tilde{v}_2 \ \ldots \ \tilde{v}_{12}]^T$$

The solution to the minimization problem posed in Equation 40 is $\hat{\eta} = \alpha\tilde{v}_{12}$ where $\alpha$ is a scaling constant and $\tilde{v}_{12}$ is the column of $\tilde{V}$ associated with the smallest singular value of $\tilde{B}$. The scaling constant is needed because $\tilde{v}_{12}$ generated by the SVD is only a unit vector pointing in the same direction as $\hat{\eta}$. For ease of notation, let us denote this unit vector $\tilde{v}_{12} = \overline{\eta}$. The scaling constant $\alpha$ can be easily estimated using the camera calibration parameters M as follows:

$$\hat{C}_n^b = M^{-1}(\alpha \overline{H}_1) \quad (42)$$

where $$\overline{H}_1 = \begin{bmatrix} \overline{\eta}_1 & \overline{\eta}_2 & \overline{\eta}_3 \\ \overline{\eta}_5 & \overline{\eta}_6 & \overline{\eta}_7 \\ \overline{\eta}_9 & \overline{\eta}_{10} & \overline{\eta}_{11} \end{bmatrix} \quad (43)$$

Since $\hat{C}_n^b$ has to be a proper transformation matrix, the following constraint must be satisfied:

$$\det(\hat{C}_n^b) (= \det(\alpha M^{-1}\overline{H}_1) = \alpha^3 \det(M^{-1}\overline{H}_1)) = 1 \quad (44)$$

which leads to:

$$\alpha = \frac{1}{\left(\det(\overline{C}_n^b)\right)^{\frac{1}{3}}} \quad (45)$$

Thus, $\hat{\eta} = \alpha\overline{\eta}$ and $\hat{\eta}$ is used to form $\hat{H} = [\hat{H}_1 \ \hat{H}_2]$ from which it follows that the navigation states of interest are given by:

$$\hat{C}_n^b = \alpha M^{-1}\overline{H}_1 \quad (46)$$

$$\hat{p}^n = \overline{H}_1^{-1}\overline{H}_2 \quad (47)$$

Numerical errors in computing the the $\hat{C}_n^b$ matrix may have caused it to become non-orthogonal. Failure to compensate for this can cause the filter to diverge. In order to ensure that the $\hat{C}_n^b$ matrix is orthogonal, the SVD of the $\hat{C}_n^b$ is taken:

$$\hat{C}_n^b = \hat{U}\hat{\Sigma}\hat{V}^T \quad (48)$$

and the orthogonal matrix $\check{C}_n^b$ is calculated according to:

$$\check{C}_n^b = \hat{U}\hat{V}^T \quad (49)$$

3.2.3 Normalizing Pixel and Landmark Coordinates

Although the algorithm presented above appears sound, if it is put into practice without adjustments it will produce poor estimates for the camera's position and attitude. This occurs because some of the equations above contain ill-conditioned matrices, particularly the matrices $B_t$ and $B$ in Equations 37 and 38. The matrices are ill-conditioned because of the relative magnitudes of the elements of $\lambda_i$ and $e_i$. For example, if ECEF coordinates are being used to describe the physical location of landmarks, then the first three elements of $\lambda_i$ can be on the order of $10^6$ m while the fourth element is unity. Similarly, if high resolution cameras (1280×1024 pixels) are being used, the first three elements of $e_i$ are the order of $10^3$ pixels while the fourth element is unity. This makes the B and $\Delta B$ matrices ill-conditioned.

The remedy for this is to scale $e_i$ and $\lambda_i$ before the DLT is performed. If the scaled versions of these vectors is denoted as $e'_t$ and $\lambda'_t$ then the relation between scaled and original vector is given by:

$$e'_t = T_e e_t \quad (50)$$

$$\lambda'_t = T_\lambda \lambda_t \quad (51)$$

There several options for scaling that can be used, but in the work described the following scaling matrices are used:

$$\begin{bmatrix} \lambda'_{x,t} \\ \lambda'_{y,t} \\ \lambda'_{z,t} \\ 1 \end{bmatrix} = \begin{bmatrix} \frac{\sqrt{3}}{s_x} & 0 & 0 & -\frac{\sqrt{3}}{s_x}m_x \\ 0 & \frac{\sqrt{3}}{s_y} & 0 & -\frac{\sqrt{3}}{s_y}m_y \\ 0 & 0 & \frac{\sqrt{3}}{s_z} & -\frac{\sqrt{3}}{s_z}m_z \\ 0 & 0 & 0 & 1 \end{bmatrix} \begin{bmatrix} \lambda_{x,t} \\ \lambda_{y,t} \\ \lambda_{z,t} \\ 1 \end{bmatrix} \quad (52)$$

where $m_x$, $m_y$, and $m_z$ are the mean value of all $\lambda_i$ in x, y and z direction, respectively. And $s_x$, $s_y$, $s_z$ are the associated standard deviation. The concept behind this transformation is to move the origin to the mean of all $\lambda_i$ and set the average distance from feature points to the origin equal to $\sqrt{3}$ for all three directions. So that all four components for $i^{th}$ feature points have the same order of magnitude. For the measurement $e_i$, the normalization is similar to what was discussed for $\lambda_i$:

$$\begin{bmatrix} u'_t \\ v'_t \\ 1 \end{bmatrix} = \begin{bmatrix} \frac{\sqrt{2}}{s_u} & 0 & -\frac{\sqrt{2}}{s_u}m_u \\ 0 & \frac{\sqrt{2}}{s_v} & -\frac{\sqrt{2}}{s_v}m_v \\ 0 & 0 & 1 \end{bmatrix} \begin{bmatrix} u_t \\ v_t \\ 1 \end{bmatrix} \quad (53)$$

$m_u$, $m_v$, $s_u$, $s_v$ are the mean and standard deviation of all intercepts in horizontal and vertical direction, respectively. Under normalization, the relationship between pixels and landmark coordinates is recast as:

$$e'_i = T_e H T_\lambda^{-1} \lambda'_i = H'\lambda'_i \quad (54)$$

where $H' = T_e H T_\lambda^{-1}$. Thus, instead of using the DLT to solve for H, the pixel and landmarks are normalized, and the DLT is used to solve for H'. Then H is denormalized from H' according to $$H = T_e^{-1} H' T_\lambda \quad (55)$$

H is then used to compute $\hat{C}_n^b$ and $\hat{p}^n$, starting in Equation 42. It is important to note that normalizing is not an optional procedure—failure to normalize the pixel and landmark coordinates will lead to poor results. In the covariance estimation that follows, normalization will be used again to mitigate the effects of ill-conditioned matrices. When using normalized coordinates for pixels and landmarks, the noise levels for pixel registration and landmark surveying also change due to the normalization. They are assumed to be Gaussian and will remain Gaussian but their covariance will change. For pixel registration this is calculated as:

$$\varepsilon \left\{ \begin{bmatrix} \delta u'_t \\ \delta v'_t \end{bmatrix} [\delta u'_t \ \delta v'_t] \right\} = \begin{bmatrix} \sigma^2_{u'_t} & \sigma_{u'_t v'_t} \\ \sigma_{u'_t v'_t} & \sigma^2_{v'_t} \end{bmatrix} \quad (56)$$

where $\sigma_{v'_t}^2$, $\sigma_{u'_t v'_t}$, and $\sigma_{u'_t}^2$ are calculated from $$P_{e'} = \begin{bmatrix} \sigma^2_{v'_t} & \sigma_{u_t v_t} & 0 \\ \sigma_{u'_t v'_t} & \sigma^2_{u'_t} & 0 \\ 0 & 0 & 0 \end{bmatrix} = T_e \begin{bmatrix} \sigma^2_{v_t} & \sigma_{u_t v_t} & 0 \\ \sigma_{u_t v_t} & \sigma^2_{u_t} & 0 \\ 0 & 0 & 0 \end{bmatrix} (T_e)^T \quad (57)$$

Similarly, for landmark survey errors:

$$P_{\lambda'} = \begin{bmatrix} \sigma^2_{X'_t} & \sigma_{X'_t Y'_t} & \sigma_{X'_t Z'_t} & 0 \\ \sigma_{X'_t Y'_t} & \sigma^2_{Y'_t} & \sigma_{Y'_t Z'_t} & 0 \\ \sigma_{X'_t Z'_t} & \sigma_{Y'_t Z'_t} & \sigma^2_{Z'_t} & 0 \\ 0 & 0 & 0 & 0 \end{bmatrix} = \quad (58)$$

$$T_\lambda \begin{bmatrix} \sigma^2_{X_t} & \sigma_{X_t Y_t} & \sigma_{X_t Z_t} & 0 \\ \sigma_{X_t Y_t} & \sigma^2_{Y_t} & \sigma_{Y_t Z_t} & 0 \\ \sigma_{X_t Z_t} & \sigma_{Y_t Z_t} & \sigma^2_{Z_t} & 0 \\ 0 & 0 & 0 & 0 \end{bmatrix} (T_\lambda)^T$$

Using the normalized pixel and landmark coordinates and their normalized covariances to calculate the covariance of the projective transform will result in the covariance being calculated for $\hat{\eta}'$ and not $\hat{\eta}$. One can write a relationship between $\hat{\eta}'$ and $\hat{\eta}$ of the form $\hat{\eta}' = T_{\hat{\eta}} \hat{\eta}$, where $T_{\hat{\eta}}$ is the Kronecker tensor product between $T_\epsilon$ and $(T_\lambda^{-1})^T$ or $T_{\hat{\eta}} = T_\epsilon \otimes (T_\lambda^{-1})^T$. Therefore:

$$P_{\hat{\eta}} = T_{\hat{\eta}}^{-1} P_{\hat{\eta}'} (T_{\hat{\eta}}^{-1})^T \quad (59)$$

With this relationship established, it is time to calculate the covariance of the projective transform.

3.3 VISNAV Error Estimation

Once the attitude and position solution have been calculated, the covariance estimation proceeds in three major steps. First, the normalized pixel and landmark survey errors are related to the covariance of $\bar{\eta}'$, where $\bar{\eta}'$ is the smallest singular value of $\tilde{B}'$. This covariance is called $P_{\bar{\eta}'}$. Next $\alpha$ and P are used to calculate the covariance of the elements of the H' matrix or $P_{\hat{\eta}'}$. $T_{\hat{\eta}}$ is used to denormalize $P_{\hat{\eta}'}$, producing $P_{\hat{\eta}}$. Finally, $P_{\hat{\eta}}$ is used to calculate the attitude covariance $P_\alpha$ and the position covariance $P_p$.

3.3.1 Calculating $P_{\bar{\eta}}$ and $P_\eta$

In the derivation that follows, the use of an apostrophe denotes a quantity that is using normalized pixel and landmark coordinates, and their associated, normalized noise statistics. The covariance matrix $P_{\bar{\eta}'}$ is defined as:

$$P_{\bar{\eta}'} = \epsilon \{\delta \bar{\eta}' \delta \bar{\eta}'^T\} \quad (60)$$

where $\delta \bar{\eta}' = \bar{\eta}' - \bar{\eta}'$. This can be rearranged as $\bar{\eta}' = \bar{\eta}' + \delta \bar{\eta}'$. Recalling that $\bar{\eta}'$ is the unscaled solution to Equation 40 leads to the relationships:

$$\tilde{B}' \bar{\eta}' = 0 \quad (61)$$

$$\tilde{B}' \bar{\eta}' = (B' + \Delta B')(\bar{\eta}' + \delta \bar{\eta}') \quad (62)$$

By dropping the higher order terms, and using the identity $B' \bar{\eta}' = 0$, these equations yield:

$$-B' \delta \bar{\eta}' = \Delta B' \bar{\eta}' \quad (63)$$

Because rank (B') is 11, the Eckart-Young theorem can be used to approximate B as:

$$B' \approx U_S \Sigma_S V_S^T \quad (64)$$

where $U_S \Sigma_S V_S^T$ is the rank deficient matrix formed by retaining the first eleven singular values in $\tilde{E}'$ and the first eleven columns of $\tilde{U}'$ and $\tilde{V}'$. Substituting this into Equation 63 and solving for $\delta \bar{\eta}'$ gives:

$$\delta \bar{\eta}' = (-V_S \Sigma_S^{-1} U_S^T)(\Delta B') \bar{\eta}' \quad (65)$$

$\Delta B'$ can therefore be related directly to $\sigma_{u'_i}$, $\sigma_{v'_i}$ and $\sigma_{u'_i v'_i}$ by stacking $\Delta B'_i$ for i=1, 2, . . . , N N where $$\Delta B'_t = \begin{bmatrix} Z_{1\times 4} & -\delta \lambda_t'^T & \lambda_t' \delta v'_t \\ \delta \lambda_t'^T & Z_{1\times 4} & -\lambda_t'^T \delta u'_t \end{bmatrix} \quad (66)$$

Now Equation 65 is rearranged by converting $\Delta B'$ into a vector $\delta b'$ $$\delta \bar{\eta}' = V_S \Sigma_S^{-1} U_S^T \bar{V} \delta b' \quad (67)$$

where $\bar{V} \in \mathbb{R}^{(2N \times (2N \times 12))}$ is $\tilde{v}'_{12}$ written in matrix form as follows:

$$\bar{V} = \begin{bmatrix} \tilde{v}_{12}'^T & & & \\ & \tilde{v}_{12}'^T & & \\ & & \ddots & \\ & & & \tilde{v}_{12}'^T \end{bmatrix} \quad (68)$$

and $\delta b' \in \mathbb{R}^{(2N \times 12) \times 1}$ is the vectorized form of $\Delta B'$ $$\delta b' = \begin{bmatrix} Z_{4\times 1} \\ -\delta \lambda_1' \\ \lambda_1' \delta v_1' + v_1' \delta \lambda_1' \\ Z_{4\times 1} \\ \delta \lambda_1' \\ -\lambda_1' \delta u_1' + u_1' \delta \lambda_1' \\ \vdots \end{bmatrix} \quad (69)$$

The above equations can now be used to write:

$$P_{\bar{\eta}'} = V_S \Sigma_S^{-1} U_S^T \bar{V} P_{\delta b'} \bar{V}^T U_S \Sigma_S^{-T} V_S^T \quad (70)$$

$$= \Gamma P_{\delta b'} \Gamma \quad (71)$$

where $P_{\delta b_t'} = E\{\delta b' \delta b'^T\}$. Note that $P_{\bar\eta'}$ could also be calculated as:

$$P_{\bar\eta'} = J_{v'^T} P_{\delta b'} J_{v'^T}^T \tag{72}$$

where $J_{v'^T}$ is the Jacobian of $v'^T$, which can be calculated using the derivation in [24]. However, calculating $J_{v'^T}$ is an $O(N^3)$ operation, while the method presented in this work takes advantage of sparseness to be $O(N)$, where N is the number of landmarks.

The entries in $P_{\delta b_t'}$ can be calculated by taking the partial derivatives of $\delta b'$ with respect to each $X'_t, Y'_t, Z'_t, u'_t$, and $v'_t$. Using Equations 29 through 31 leads to defining $P_{\delta b_t'}$ as a large, sparse, block-diagonal matrix where each diagonal entry is a partitioned 24×24 matrix $P_{\delta b_t'}$ of the following form:

$$P_{\delta b_t} = \begin{bmatrix} Z_{4\times 4} & Z_{4\times 4} & Z_{4\times 4} & & Z_{4\times 4} \\ P_{\lambda_t'} & -v_t' P_{\lambda_t'} & -P_{\lambda_t'} & & u_t' P_{\lambda_t'} \\ -v_t P_{\lambda_t'} & v_t'^2 P_{\lambda_t'} + \sigma_{v_t'}^2 \lambda_t' \lambda_t'^T & v_t' P_{\lambda_t'} & & -u_t' v_t' P_{\lambda_t'} - \sigma_{u_t' v_t'} \lambda' \\ Z_{24\times 4} & -P_{\lambda_t'} & v_t' P_{\lambda_t'} & P_{\lambda_t'} & Z_{24\times 4} & -u_t' P_{\lambda_t'} \\ Z_{4\times 4} & Z_{4\times 4} & Z_{4\times 4} & & Z_{4\times 4} \\ & -u_t' v_t' P_{\lambda_t'} - & & & u_t'^2 P_{\lambda_t'} + \sigma_{u_t'}^2 \lambda_t' \lambda_t'^T \\ u_t P_{\lambda_t'} & \sigma_{u_t' v_t'} \lambda' \lambda_t'^T & -u_t' P_{\lambda_t'} & & \end{bmatrix} \tag{73}$$

Recall that $P_{\lambda_t'}$ is the 4×4 matrix representing the normalized uncertainty in the world coordinates of the landmark $\lambda'_t$, which was defined in Equation 58. At this point, having calculated the normalized, unscaled covariance $P_{\bar\eta'}$, the covariance can be denormalized. Using Equation 59, the denormalized, unscaled covariance $P_{\bar\eta}$ is calculated:

$$P_{\bar\eta} = T_\eta^{-1} P_{\bar\eta'} (T_\eta^{-1})^T \tag{74}$$

Now the unscaled covariance $P_{\bar\eta}$ can be used to calculate the scaled covariance $P_\eta$. To do this, it is noted that $$P_\eta = \epsilon\{\delta\eta \delta\eta^T\} \tag{75}$$

where $\delta\eta$ is defined as:

$$\delta\eta = \delta(\alpha\bar\eta) = \bar\eta \frac{\partial\alpha}{\partial\bar\eta}\delta\bar\eta + \frac{\partial\bar\eta}{\partial\bar\eta}\delta\bar\eta\alpha = \left[\bar\eta\frac{\partial\alpha}{\partial\bar\eta} + \alpha I_{12}\right]\delta\bar\eta \tag{76}$$

An explicit value for $$\frac{\partial\alpha}{\partial\bar\eta}$$

must be derived. Applying the chain rule to Equation 45 yields:

$$\frac{\partial\alpha}{\partial\bar\eta} = \frac{-[\det(\bar H_1)]^{-\frac{1}{3}}}{3[\det(M^{-2})]^{\frac{1}{3}}} \frac{\partial}{\partial\bar\eta}(\det(\bar H_1)) \text{ where} \tag{77}$$

$$\frac{\partial}{\partial\bar\eta}(\det(\bar H_1)) \text{ is:}$$

$$\frac{\partial}{\partial\bar\eta}(\det(\bar H_1)) = \tag{78}$$

$$[D_{11} \quad -D_{12} \quad D_{13} \quad 0 \quad -D_{21} \quad D_{22} \quad -D_{23} \quad 0 \quad D_{31} \quad -D_{32} \quad D_{33} \quad 0]$$

and $D_{i,j}$ is the unsigned cofactor of the $i^{th}$, $j^{th}$ entry in $\bar H_1$. Substituting into Equation 76 gives $$\delta\eta = \left[\bar\eta\frac{-[\det(\bar H_1)]^{-\frac{4}{3}}}{3[\det(M^{-1})]^{\frac{1}{3}}}[D_{11} \quad -D_{12} \quad D_{13} \quad 0 \quad \ldots \quad D_{33} \quad 0] + \alpha I_{12}\right]\delta\bar\eta \tag{79}$$

$$\delta\eta = G\delta\bar\eta \tag{80}$$

and, therefore, $$P_\eta = G^T P_{\bar\eta} G \tag{81}$$

$$= G^T T_\eta^{-1} P_{\delta b'} \Gamma^T (T_\eta^{-1})^T G \tag{82}$$

This completes the derivation of the expression for $P_\eta$.

3.3.2 Relating $P_\eta$ to Attitude Errors

Now the covariance for $\eta$ must be related to the covariance of the attitude. Euler angles are used to represent the attitude state. This results in a three step process to relate $P_\eta$ to Euler angle errors. First $P_\eta$ is used to derive the covariance for the elements of $\hat C_n^b$ or $P_\epsilon$. Next, the covariance of the orthogonalized $\check C_n^b$ or $P_\epsilon$ is calculated. Then $P_\epsilon$ is used to determine the covariance for the attitude errors.

Relating $P_\eta$ to $P_\epsilon$ is straight forward. This is done by noting that:

$$H_1 = M\hat C_n^b = \begin{bmatrix} \eta_1 & \eta_2 & \eta_3 \\ \eta_5 & \eta_6 & \eta_7 \\ \eta_9 & \eta_{10} & \eta_{11} \end{bmatrix} \tag{83}$$

$$\hat C_n^b = M^{-1} H_1 \tag{84}$$

Next the above equation is "vectorized" by arranging the elements of $\hat C_n^b$ into a 9×1 vector.

$$c \equiv \begin{bmatrix} c_{11} \\ c_{12} \\ c_{13} \\ c_{21} \\ \vdots \\ c_{33} \end{bmatrix} = S_1 \eta \tag{85}$$

The notation $c_{ij}$ is used to indicate the element of $\hat C_n^b$ found in the $i^{th}$ row and $j^{th}$ column. The matrix $S_1 = S_1(M)$ is a shaping matrix which depends on the camera calibration matrix M. The subscript "1" is used because this is the first of two such shaping matrices that will be used. Now assuming M is known without error, one can write:

$$\delta c = S_1 \delta\eta \tag{86}$$

from which follows $$P_\epsilon = \epsilon\{\delta c \delta c^T\} \tag{87}$$

$$= \epsilon\{S_1 \delta\eta \delta\eta^T S_1^T\} \tag{88}$$

$$= S_1 P_\eta S_1^T \tag{89}$$

Next the covariance of the orthogonal $\check{C}_n^b$ matrix must be calculated. From examining Equation 49, it is clear that the covariance $P_\epsilon$ is calculated as:

$$P_{\check{c}} = \left[\frac{\partial \hat{U}}{\partial \hat{C}_n^b}\hat{V}^T + \hat{U}\frac{\partial \hat{V}^T}{\partial \hat{C}_n^b}\right]P_{\hat{c}}\left[\frac{\partial \hat{U}}{\partial \hat{C}_n^b}\hat{V}^T + \hat{U}\frac{\partial \hat{V}^T}{\partial \hat{C}_n^b}\right]^T \quad (90)$$

$$P_\epsilon = J_{uv}P_{\hat{c}}J_{uv}^T \quad (91)$$

where $\hat{U}$ and $\hat{V}^T$ come from the SVD of $\hat{C}_n^b$. An elegant method of calculating $$\frac{\partial \hat{U}}{\partial \hat{C}_n^b}$$

and $$\frac{\partial \hat{V}^T}{\partial \hat{C}_n^b}$$

is presented in [24].

With $P_\epsilon$ calculated, it must now be related to Euler angle errors. For the 3-2-1 Euler angle sequence $C_n^b$ is given by:

$$\check{C}_n^b = \begin{bmatrix} C_{\check{\theta}}C_{\check{\psi}} & C_{\check{\theta}}S_{\check{\psi}} & -S_{\check{\theta}} \\ S_{\check{\phi}}S_{\check{\theta}}C_{\check{\psi}} - C_{\check{\phi}}S_{\check{\psi}} & S_{\check{\phi}}S_{\check{\theta}}S_{\check{\psi}} - C_{\check{\phi}}C_{\check{\psi}} & S_{\check{\phi}}C_{\check{\theta}} \\ C_{\check{\phi}}S_{\check{\theta}}C_{\check{\psi}} + S_{\check{\phi}}S_{\check{\psi}} & C_{\check{\phi}}S_{\check{\theta}}S_{\check{\psi}} - S_{\check{\phi}}C_{\check{\psi}} & C_{\check{\phi}}C_{\check{\theta}} \end{bmatrix} \quad (92)$$

where $c_{(\cdot)}$ and $s_{(\cdot)}$ are used as short-hand for cos and sin of $(\bullet)$. From this it can be seen that the Euler angles are related to the elements of $\check{C}_n^b$ by the following non-linear relations:

$$\check{\phi} = \tan^{-1}\left(\frac{c_{22}}{c_{32}}\right) \quad (93)$$

$$\check{\theta} = -\sin^{-1}c_{13} \quad (94)$$

$$\check{\psi} = \tan^{-1}\left(\frac{c_{12}}{c_{11}}\right) \quad (95)$$

A perturbation of these relations leads to:

$$\delta\alpha_N \equiv \check{\phi} - \phi \approx \left(\frac{c_{23}}{c_{23}^2 + c_{33}^2}\right)\delta c_{23} - \left(\frac{c_{23}}{c_{23}^2 + c_{33}^2}\right)\delta c_{33} \quad (96)$$

$$\delta\alpha_E \equiv \check{\theta} - \theta \approx \left(-\frac{1}{\sqrt{1-c_{12}^2}}\right)\delta c_{13}$$

$$\delta\alpha_N \equiv \check{\psi} - \psi \approx \left(\frac{c_{11}}{c_{12}^2 + c_{11}^2}\right)\delta c_{12} - \left(\frac{c_{12}}{c_{12}^2 + c_{11}^2}\right)\delta c_{11}$$

Note that $\delta\alpha$ is not a standard vector in the sense that addition of attitude error vectors does not yield another attitude error vector. This is just a notational convenience. Using this definition of $\alpha$ Equation 96 is written as $$\delta\alpha = S_2 \delta c \quad (97)$$

where $S_2 = S_2(C_n^b)$ is another shaping matrix. From this it follows that the Euler angle covariance matrix $P_\alpha$ is given by:

$$P_\alpha = S_2 P_\epsilon S_2^T \quad (98)$$

$$= S_2 J_{uv} S_1 P_\eta S_1^T J_{uv}^T S_2^T \quad (99)$$

$$= S P_\eta S^T \quad (100)$$

where the overall shaping matrix S is defined as $S = S_2 J_{uv} S_1$.

3.3.3 Relating $P_\eta$ to Position Errors

To relate $P_\eta$ the position solution covariance $P_p$, define the following three auxiliary variables $$E \equiv -(MC_n^b)^{-1} = -H_1^{-1} \quad (101)$$

$$\eta_1 \equiv [\eta_1\ \eta_2\ \eta_3\ \eta_5\ \eta_6\ \eta_7\ \eta_9\ \eta_{10}\ \eta_{11}]^T \quad (102)$$

$$= S_3 \eta \quad (103)$$

$$\equiv [\eta_4\ \eta_8\ \eta_{12}]^T \quad (104)$$

$$= S_4 \eta \quad (105)$$

where $S_3$ and $S_4$ are shaping matrices. Then note that $$p^n = E\eta_2 = Fe \quad (106)$$

The second equality in the equation above is just a rewrite of the first where the matrix E has been written as a vector e while $\eta_2$ has been rearranged into the matrix F. A perturbation of the equation above leads to:

$$\delta p^n = E\delta\eta_2 + F\delta e \quad (107)$$

By the rules of perturbations:

$$\delta e = \frac{\partial e}{\partial \eta_1}\delta\eta_1 = J_e \delta\eta_1 \quad (108)$$

where $J_e$ is the Jacobian of the vector e. Substituting into Equation 107 gives:

$$\delta p^n = E\delta\eta_2 + FJ_e\delta\eta_1 \quad (109)$$

$$= (ES_4 + FJ_e S_3)\delta\eta \quad (110)$$

$$= J_p \delta\eta \quad (111)$$

By definition, the position covariance is:

$$P_p = \epsilon\{\delta p^n (\delta p^n)^T\} \quad (112)$$

$$= \epsilon\{(J_p\delta\eta)(J_p\delta\eta)^T\} \quad (113)$$

$$= J_p P_\eta J_p^T \quad (114)$$

UThe VISNAV measurement covariance matrix $R_\epsilon$ from Equation 12 can be calculated as:

$$R_s = \begin{bmatrix} J_p \\ J_a \end{bmatrix} P_\eta \begin{bmatrix} J_p \\ J_a \end{bmatrix}^T \quad (115)$$

$$= \begin{bmatrix} J_p \\ J_a \end{bmatrix} G^T T_\eta^{-1} \Gamma P_{\delta br} \Gamma^T (T_\eta^{-1})^T G \begin{bmatrix} J_p \\ J_a \end{bmatrix}^T \quad (116)$$

$$= L P_{\delta b} L^T \quad (117)$$

3.3.4 Calculating the Measurement Correlation Matrix $\Psi$

The next step is to calculate the measurement correlation matrix $\Psi$, which was defined in Equation 14. This is done by computing the time correlation in the $\delta b'$ at step k and k−1:

$$P_{\delta b',k,k-1} = \epsilon\{\delta b'_k \delta b'_{k-1}\} \tag{118}$$

This is done in a similar fashion to Equation 73, except that landmark errors are the only errors sources that are correlated in time. Then the measurement correlation matrix $\Psi$ can be calculated as:

$$\begin{bmatrix} R_{s,k-1} & R_{s,k,-1} \\ R_{s,k,k-1} & R_{s,k} \end{bmatrix} = \tag{119}$$

$$\begin{bmatrix} L_{k-1} & Z \\ Z & L_k \end{bmatrix} \begin{bmatrix} P_{\delta br,k-1} & P_{\delta br,k,k-1} \\ P_{\delta br,k,k-1} & P_{\delta br,k} \end{bmatrix} \begin{bmatrix} L_{k-1} & Z \\ Z & L_g \end{bmatrix}^T$$

$$\Psi_k = R_{\epsilon,k,k-1} \tag{120}$$

Although this appears computationally intensive (the central term in the right hand side of Equation 119 is 48N×48N), the matrices are sparse and many calculations from the previous step may be reused. With a term for $\Psi$ computed, the next task is to evaluate the accuracy of the derived covariance matrices.

3.3.5 Validating the DLT Covariance Estimate

Monte Carlo simulations were run to validate the results of the preceding covariance analysis. One hundred thousand DLT position and attitude solutions were computed using the two setups that are described in Table 1.

TABLE 1

|  | Landmark Geometry | Landmark Covariance | | | Pixel Covariance | |
|---|---|---|---|---|---|---|
| Setup 1 | The landmarks are spread across the camera's entire imaging plane. | 1.0<br>0.0<br>0.0 | 0.0<br>1.0<br>0.0 | 0.0<br>0.0<br>1.0 | 1.21<br>0.0 | 0.0<br>1.21 |
| Setup 2 | The landmarks are contained in the central third of camera's imaging plane. | 1.0<br>0.0<br>0.0 | 0.0<br>1.0<br>0.0 | 0.0<br>0.0<br>1.0 | 1.21<br>0.0 | 0.0<br>1.21 |

In Table 1 Monte Carlo Inputs, the landmark covariance is expressed in meters$^2$, and the pixel covariance is expressed in pixels$^2$.

15 feature points were used in both setup 1 and setup 2. For both cases, the mean feature point distance from the camera was 50 meters. The geometries of setup 1 and setup 2 were chosen to illustrate the failure mode of the DLT covariance algorithm. As shown in Table 1, for setup 1, the detected pixel locations for the landmarks are spread across the imaging plane, while in setup 2, the detected pixel locations for the landmarks are contained in the central third of the imaging plane.

TABLE 2

| Setup 1 | | | | | | | | |
|---|---|---|---|---|---|---|---|---|
| Data Covariance | | | DLT Covariance | | | Mahalanobis Constraint | | |
| Position Covariance | | | | | | | | |
| 2.46 | −2.37 | −6.24 | 2.36 | −2.26 | −5.96 | 2.39 | −2.29 | −6.02 |
| −2.37 | 4.99 | 10.14 | −2.26 | 4.78 | 9.71 | −2.29 | 4.84 | 9.78 |
| −6.24 | 10.14 | 27.22 | −5.96 | 9.71 | 26.24 | −6.02 | 9.78 | 26.30 |
| Attitude Covariance | | | | | | | | |
| 2.46e$^{-2}$ | 8.9e$^{-5}$ | 3.93e$^{-4}$ | 2.53e$^{-2}$ | 7.2e$^{-5}$ | 3.79e$^{-4}$ | 2.45e$^{-2}$ | 9.7e$^{-5}$ | 3.86e$^{-4}$ |
| 8.9e$^{-5}$ | 7.36e$^{-3}$ | 2.95e$^{-3}$ | 7.2e$^{-5}$ | 7.57e$^{-3}$ | 3.03e$^{-3}$ | 9.7e$^{-5}$ | 7.32e$^{-3}$ | 2.93e$^{-3}$ |
| 3.93e$^{-4}$ | 2.95e$^{-3}$ | 2.05e$^{-3}$ | 3.79e$^{-4}$ | 3.03e$^{-3}$ | 2.04e$^{-3}$ | 3.86e$^{-4}$ | 2.93e$^{-3}$ | 2.04e$^{-3}$ |
| Setup 2 | | | | | | | | |
| Position Covariance | | | | | | | | |
| 1.56e$^3$ | −3.97e$^3$ | −9.86e$^3$ | 7.706 | −17.0 | −43.73 | 7,705 | −16.85 | −43.15 |
| −3.97e$^3$ | 1.01e$^4$ | 2.51e$^4$ | −17.0 | 45.55 | 114.13 | −16.85 | 45.63 | 113.58 |
| −9.86e$^3$ | 2.51e$^4$ | 6.22e$^4$ | −43.73 | 114.13 | 294.79 | −43.15 | 113.58 | 292.06 |
| Attitude Covariance | | | | | | | | |
| 2.56e$^{-1}$ | 2.79e$^{-2}$ | 1.80e$^{-2}$ | 3.45e$^{-1}$ | 4.05e$^{-2}$ | 1.29e$^{-2}$ | 2.33e$^{-1}$ | 1.63e$^{-2}$ | 6.33e$^{-3}$ |
| 2.79e$^{-2}$ | 8.84e$^{-2}$ | 3.66e$^{-2}$ | 4.05e$^{-2}$ | 1−29e$^{-1}$ | 4.66e$^{-2}$ | 1.63e$^{-2}$ | 8.01e$^{-2}$ | 2.91e$^{-2}$ |
| 1.80e$^{-2}$ | 3.66e$^{-2}$ | 2.76e$^{-2}$ | 1.29e$^{-1}$ | 4.66e$^{-2}$ | 1.95e$^{-2}$ | 6.33e$^{-3}$ | 2.91e$^{-2}$ | 1.67e$^{-2}$ |

Table 2: Monte Carlo Results. The covariance that is calculated from 100,000 Monte Carlo outputs is shown on the left, the analytical DLT covariance is shown in the center, and the covariance of solutions that have passed the Mahalanobis constraint is shown on the right. Units are in meters$^2$ and radians$^2$.

As shown in Table 2, the DLT covariance algorithm works well for setup 1, but does not work well for setup 2. This is because, for setup 2, the landmark noise is on the same order as the spacing in between points. This causes landmarks to be "flipped"—one landmark will have a detected pixel u, v to the left of a second landmark's detected pixel u, v, but the first landmark's noisy X, Y, Z position is located to the right of the second landmark's noisy X, Y, Z position. When flipping occurs, the camera solution will have a large, non-Gaussian attitude and position error. Fortunately, because the errors that result from this are so large, it is easy to detect when this has occurred and to keep it from being included in the navigation solution. This is done by computing the squared Mahalanobis distance M of the state vector error update, and if it exceeds a threshold, discarding the measurement. The squared Mahalanobis distance of the state vector error update is:

$$M \equiv (\delta x_k)^T H_v^T R_\epsilon^{-1} H_v (\delta x_k) \quad (121)$$

where the state vector $\delta x_k$ is defined in Equation 2, the VISNAV measurement matrix $H_v$ is defined in Equation 11, and $R_\epsilon$ is defined in Equation 12. The threshold used in this work is 22.458, which will discard 0.1% of measurements that obey a Chi-square distribution. It also removes the erroneous measurements that come from the "flipping" failure mode, which allows the analytically derived covariance to accurately describe the data. For setup 2's closely spaced landmarks, applying the Mahanabolis threshold caused 6.4% of the solutions to be discarded, while for the widely spaced landmarks in setup 1, 0.35% were discarded.

4 Filter Performance

Simulation studies and experiments that used real-world data were conducted to verify the VISNAV system.

4.1 Simulation Studies

In what follows the results of series of simulation studies are presented that assess the performance of the integrated INS/GNSS/Camera navigation system discussed in this paper. The system simulated fuses an automotive grade IMU [1, 13], a code-phase GPS receiver and VISNAV. VISNAV and the GPS receiver provide periodic measurement updates which are asynchronous. As noted earlier, VISNAV provides position and attitude while the GPS receiver provides position and velocity estimates. Both sensors provide aiding to the INS. Since VISNAV provides position as well as attitude, it solves the observability problem encountered when integrating an INS and GPS. Specifically, in the absence of a large acceleration signal, yaw (and yaw gyro bias) is unobservable or weakly observable in an integrated INS/GPS system. Since VISNAV provides a direct measure of yaw, this observability issue is eliminated.

4.1.1 Scenario Description

Table 3 gives a high level overview of the dynamics of the scenario. The simulation scenario depicted in FIG. 8 and described in Table 3 consists of a long, straight run with very little acceleration between the 2$^{nd}$ and 3$^{rd}$ minutes. The purpose of this portion of the simulated trajectory is to highlight the issue of observability discussed above by allowing a comparison between the INS/GPS and the INS/camera architectures. Simulated sensor quality is described in Table 4. As noted previously, one of the inputs to the estimator is pixel noise covariances or $\sigma_{u_i}$, $\sigma_{v_i}$ and $\sigma_{u_i v_i}$. Pixel jitter was determined from a series of experiments using our implementation of SURF and our camera [11]. These tests showed that pixel jitter can be over-bounded by a Gaussian with 1.03 pixel σ. 1 meter σ landmark noise is added to the landmark X, Y and Z. This value was determined from Monte Carlo simulations of the landmark surveying technique that is described in [20]. Table 3 shows a simulation scenario timeline,

TABLE 3 shows a simulation scenario timeline.

| Time | Event |
|---|---|
| 0:00:00 | The platform is static. |
| 0:01:00 | The platform begins accelerating North. |
| 0:01:10 | The platform platform stops accelerating. Its speed is 5.144 m/s. |
| 0:03:10 | The platform begins a series of turns and accelerations that last until the scenario ends. Its maximum speed is 10.288 m/s. |
| 0:08:00 | The scenario ends. |

Three different sensor configurations are examined. They are GPS and IMU, VISNAV and IMU, and GPS, IMU, and VISNAV. The VISNAV is run in the absolute mode, where feature point locations are known a priori. First the error in the VISNAV position and attitude updates is shown to be accurately bounded by the VISNAV time-varying covariance estimate, and then the overall performance of the different sensor integrations are evaluated.

Table 4 shows sensor error models.

TABLE 4 shows sensor error models.

| Sensor | Sensor Noise/Error Description |
|---|---|
| IMU | Automotive/Consumer grade sensors. Errors modeled as descried in [13]. |
| GPS | GPS 0.1 meters Gaussian noise added to the position. Gaussian noise with 0.01 meters/s added to the velocity. 120 sec correlation time on both position and velocity error. |
| Camera | 1.03 pixel σ noise in u and v |
| Landmark Survey | 1.0 meter σ noise in X, Y, and Z |

FIGS. 10-14 show errors in the position and attitude measurements from VISNAV as well as the one sigma results from the VISNAV covariance algorithm. The one sigma results are shown to bound the position and attitude errors well.

FIGS. 15 through 23 show the estimated states for each of the sensor integration configurations. There are several points that need to be noted. It is clear from FIGS. 18 through 21 that the velocity performance of INS/VISNAV configuration is worse than the configurations that contain GPS. This is becuase the GPS sensor directly measures velocity, and because GPS as simulated is much less noisy than the VISNAV sensor. Also, FIGS. 21 and 22 show that the integrated INS/GPS/VISNAV filter's attitude performance is worse than the INS/GPS alone. This is not surprising given the amount of noise introduced into the pixel measurements; the INS/GPS sensor configuration settles into a steady state, while the VISNAV sensor perturbs the state with measurement error. FIG. 23 highlights one of the benefits of using a camera in an integrated system with a low-cost IMU. It is apparent from looking at the filter yaw error in FIG. 23 that the INS/GPS configuration suffers from poor observability of the yaw gyroscope bias, as evidenced by the poor estimation of yaw for t<180 seconds. This lack of observability stems from the fact that the acceleration signals are not strong enough to make these two states observable. The filter configurations that include the camera, however, do not have those issues.

4.2 Experimental Validation

In addition to runs on the simulated trajectory, the filter's performance was evaluated by post-processing images, GNSS, and IMU data from a real-world experiment. A van equipped with an IMU, GPS, and an Elphel camera [14], shown in FIG. 24, was driven through a residential neighborhood. The performance of the INS/VISNAV filter was compared to the INS/GNSS filter. The IMU was constructed in-house from three gyros [21] and three accelerometers [22]. The performance of the inertial sensors used to construct the IMU falls somewhere between automotive/consumer grade and the low-end of tactical grade. The purpose of the experiment was to evaluate the filter's performance with a priori visual landmark information and no GNSS, and a comparison of trajectories using IMU/VISNAV and IMU/GNSS is shown in FIGS. 25 and 27.

To obtain a priori coordinates of visual landmarks, each landmark was assigned a world position and position covariance by triangulating its position using two images taken during the run. The triangulation and position covariance algorithm is described in detail in [20] and briefly summarized here. The INS/GNSS filter's position and attitude solutions were used to initialize the position and attitude of the camera at the time each photo was taken. When a feature point is detected in two photographs, it can be triangulated. Rays are drawn from the camera's locations when the two photographs are taken, and linear least squares is used to compute the intersection of the two rays. This intersection is then used as the landmark's position. The covariance for the position of a visual landmark is estimated using a first-order Taylor expansion that propagates errors from INS/GNSS position and attitude uncertainty. The landmark position and position covariance were recorded for later use.

Next the filter was re-run in INS/VISNAV mode, without GPS measurement updates. When the visual landmarks were detected, they were used to generate VISNAV measurement updates, using the position and position covariances that were calculated earlier. The filter did not receive GNSS measurement updates. Following the procedure described in [20], the position covariance of each visual landmark was incorporated into the VISNAV solution by projecting the landmark's covariance onto the imaging plane and using the resulting pixel uncertainty in the VISNAV covariance estimation algorithm. The VISNAV covariance estimation algorithm generated covariances which were tuned to account for un-modeled errors in the system. Un-modeled errors include timing synchronization errors between sensors, feature point mismatches, camera calibration errors, and camera installation misalignment errors.

As shown in FIG. 25, the overall performance of the INS/VISNAV filter is favorably comparable to the INS/GNSS performance. FIG. 25 shows a 5 minute and 40 second test run. The average navigation error (defined to be the magnitude of the difference between the GNSS and the INS/VISNAV navigation solutions) for this run was 7.8 m. As shown in FIG. 26, except for a few momentary spikes, the navigation error was smaller than the mean. FIG. 27 shows an instance in the run where the navigation error was larger than the mean. The larger errors were primarily caused by feature point mismatches during point triangulation—that is, the SURF algorithm matched two points in between two photographs that were not really matches, and thus computed a nonsensical landmark position for them. This mismatch was then used to generate erroneous VISNAV positions and attitudes.

5 Conclusion

This paper discussed the loose integration of GPS, INSs and cameras for navigating in GPS denied environments. The loose integration scheme is sub-optimal from an information fusion point of view. However, because it decouples the vision-based navigation (VISNAV) solution from the inertial sensor solution, its increased robustness allows it to work with low cost inertial sensors in the automotive and consumer grades. In a loose integration it is crucial to have an accurate estimate of the measurement noise covariances. For this purpose a linearized algorithm for calculating VISNAV position and attitude covariances was developed and tested.

The covariance estimation assumes the only error source in the VISNAV solution is pixel noise. Landmark survey errors are accommodated in this framework by projecting their uncertainty on to the image plane, which transforms it to an equivalent pixel noise. The performance of this filter design was validated in a series of simulation studies and by post-processing experimental results collected from a vehicle operated in an urban setting. The results show that when GNSS is unavailable, the integrated INS/VISNAV solution provides a reasonably accurate position, attitude and velocity solution. More specifically, in the post-processed experimental results it was shown that during a 5 minute and 40 second outage of GPS, the integrated system provided a position performance with a spherical mean error of 7.8 meters.

There are improvements that can be made to the system to increase its overall performance. For example, the correlated nature of the measurement noises was dealt with by inflating the process and measurement noise covariance. This is a practical approach which has been used successfully in INS/GNSS loose integration[1, 13]. However, a more optimal solution is to account for the correlated noise by augmenting the state vector.

Finally, we reiterate that the loose integration is not a replacement architecture for the tight integration. Rather, it is an alternative mode to use when increased robustness is necessary, as in the case when inertial sensor drift is large and other measurement updates are infrequent or of poor quality. As such, a feature that will be required in a fielded INS/VISNAV system using low cost inertial sensors is a methodology to reconfigure the filter between tight and loose in response to the quality of landmarks and overall quality of the state estimate.

REFERENCES

[1] P. D. Groves, "INS/GNSS Integration," Chapter 12 *Principles of GNSS, Inertial, and Multisensor Integrated Navigation Systems*, Artech House, Boston, London, 2008, pp. 363-406.

[2] P. Misra and P. Enge, *Global Positioning System, Signals, Measurements, and Performance*, Ganga-Jamuna Press, 2001.

[3] Durrant-Whyte, H.; Bailey, T.;, *Simultaneous localization and mapping: part I*, Robotics & Automation Magazine, IEEE , vol.13, no.2, pp.99-110, June 2006

[4] Bailey, T.; Durrant-Whyte, H.;, *Simultaneous localization and mapping (SLAM): part II*, Robotics & Automation Magazine, IEEE, vol.13, no.3, pp.108-117, September 2006

[5] M. J. Veth, *Fusion of Imaging and Inertial Sensors for Navigation*, Ph.D. Dissertation (AFIT/DS/ENG/06-09), US Air Force Institute of Technology, Wright-Patterson Air Force Base, Ohio. August 2006.

[6] S. I. Roumeliotis, A. E. Johnson, and J. F. Montgomery. "Augmenting Inertial Navigation with Image-Based Motion Estimation," *Proceedings of the IEEE International Conference on Robotics and Automation (ICRA '02)*, Volume 4, pp. 4326-4333. 2002.

[7] A. I. Mourikis, N. Trawny, S. I. Roumeliotis, A. E. Johnson, and J. F. Montgomery. "Vision-Aided Inertial Navigation for Precise Planetary Landing: Analysis and Experiment," *Proceedings of the IEEE International Conference on Robotics and Automation (ICRA '02)*, Volume 4, pp. 4326-4333. 2002.

[8] Herber Bay, Andreas Ess, Tinne Tuytelaars, Luc Van Gool, "SURF: Speeded Up Robust Features," *Computer Vision and Image Understanding (CVIU)*, Vol. 110, No. 3, pp. 346-359, 2008.

[9] R. Hartley and A. Zisserman, *Multiple View Geometry in Computer Vision: Second Edition*, Cambridge University Press, Cambridge, UK. 2003.

[10] Y. Ma, S. Soatto, J. Koš ca' and S. Sastry, *An Invitation to 3-D Vision: From Images to Geometric Models*, Springer Verlag, New York, N.Y. USA. 2004.

[11] L. Lemay, C. Chu, D. Gebre-Egziabher and R. Ramlal, "Precise Input and Output Error Characterization for a Loosely Integrated INS/GPS/Camera Navigation System," *Proceedings of the Institute of Navigation (ION) 2011 International Technical Meeting*, San Diego, Calif., January 2011. pp.

[12] J. Raquet and M. Giebner. "Navigation Using Optical Measurements of Objects at Unknown Locations," *Proceedings of the 59th Annual Meeting of the Institute of Navigation*, pp. 282-290. June 2003.

[13] D. Gebre-Egziabher, M. Petovello and D. Bevly, "Integration of GNSS and INS", Chapter 6 (Part 1) and Chapter 7 (Part 2) in *GNSS Applicaitons and Methods*, Ed: Gleason and Gebre-Egziabher. Artech House Publisher, Boston, Mass. 2009. (Editors). pp. 149-190.

[14] Elphel Inc., *Specification Sheet for Elphel* 353. www.elphel.com. Last accessed on Jun. 28, 2011.

[15] J. A. Farrell, *Aided Navigation: GPS with High Rate Sensors*, McGraw-Hill, New York, N.Y. 2008

[16] S. Gleasson and D. Gebre-Egziabher, "GNSS Navigation: Estimating Position, Velocity, and Time", Chapter 3 in *GNSS Applicaitons and Methods*, Ed: Gleason and Gebre-Egziabher. Artech House Publisher, Boston, Mass. 2009. (Editors). pp. 55-86.

[17] van Huffel, S, and Vandewalle, J. "Analysis and Properties of the Generalized Total Least Squares Problem AX=B when Some or All Columns are Subject to Error," *SIAM Journal of Matrix Analysis and Applications*, Vol. 10, No. 3, 1989. pp. 294-315.

[18] Golub, G. H. and van Loan, C. F., "An Analysis of Total Least Squares Problem," *SIAM Journal of Numerical Analysis*, Vol. 17, No. 6, 1980. pp. 883-893.

[19] Mühlich, M. and Mester, R., "The Role of Total Least Squares in Motion Analysis," *Proceedings of the European Conference on Computer Vision*, 1998 (*ECCV '98*), Freiburg, Germany, 1998. pp. 305-321.

[20] Gorgen, J., and Lemay, L., *Algorithm for Triangulating Visual Landmarks and Determining their Covariance*, SPAWAR Systems Center, Pacific Report, July 2011.

[21] Systron Donner Inc., *SDG-1000 User's Guide: Model SDG-1000 Rate Sensor*, Document # 965419, Rev. A, Concord, Calif.

[22] Gladiator Technologies Inc., *A40 MEMS Accelerometer Specification Sheet*, Rev April 2011.

[23] C. Chu, D. Gebre-Egziabher, F. A. P. Lie, L. Lemay "Performance Comparison of Tight and Loose INS-Camera Integration," *Proceedings of the Institute of Navigation (ION) 2011 GNSS*, Portland, Oreg., September 21-23.

[24] T. Papadopoulo, M. I. A. Lourakis, "Estimating the Jacobian of the Singular Value Decomposition: Theory and Applications," *Proceedings of the European Conference on Computer Vision, ECCV'00*, 2000 pp. 554-570

[25] A. Bryson, L. Henrikson, "Estimation using sampled data containing sequentially correlated noise," *Journal of Spacecraft and Rockets*, June, 1968, pp. 662-665

What is claimed is:

1. A navigation system for a movable platform comprising:
    a GNSS receiver sensor configured to provide position signals representative of the estimated current position of the movable platform;
    a camera sensor configured to provide sequential photographic images representative of the surroundings of the movable platform, the sequential photographic images having matching landmarks showing the same scene that are taken from different locations;
    an IMU (Inertial Measurement Unit) sensor configured to provide specific force and angular rate signals representative of the current specific forces and rate of the movable platform;
    a processor responsive to the camera photographic images to estimate the position and attitude of the movable platform, covariance of the estimated position and attitude, and the covariance of the estimated sequential consecutive position and attitude;
    the processor responsive to the GNSS receiver's estimated position signal, the camera's estimated position and attitude signal, the camera's estimated position and attitude covariance, the camera's estimated correlation of the covariance of consecutive position and attitude estimates, and the specific force and angular rate signals, the processor configured to provide a navigation solution representative of the estimated current position, velocity, and attitude of the movable platform, the processor is further configured with a landmark database that stores the location and description of landmarks that are detected in photographic images representative of the surroundings of the movable platform and a landmark detection and tracking component that detects landmarks in photographic images representative of the surroundings of the movable platform; a triangulation component that triangulates the position of landmarks in photographic images representative of the surroundings of the movable platform; the landmark database storing the location and description of the landmarks for future use.

2. The navigation system as in claim 1, the landmark detection and tracking component configured to detect landmarks in photographic images representative of the surroundings of the movable platform and compares the landmark with the description of landmarks in the landmark database to determine if they are the same.

3. The navigation system as in claim 2, the processor further configured with a VISNAV algorithm that uses the detected landmarks and their position to form an estimate of the position and attitude of the movable platform, and estimates the covariance of the position and attitude estimates, and the correlation of the covariance of consecutive position and attitude estimates.

4. The navigation system as in claim 3, the processor further configured with an inertial navigation system that uses the specific forces and angular rate signals to form an estimate of the current position, velocity, and attitude of the movable platform.

5. The navigation system as in claim 4, the processor further configured with an extended Kalman filter that uses the GNSS receiver's estimated position signal, the camera's estimated position and attitude signal, the camera's estimated position and attitude covariance, and the camera's estimated correlation of the covariance of consecutive position and attitude estimates to form estimates of the error in the inertial navigation system's estimate of the current position, velocity, and attitude of the movable platform.

6. The navigation system as in claim 5, the extended Kalman filter further configured to use the GNSS receiver's estimated position signal, the camera's estimated position and attitude signal, the camera's estimated position and attitude covariance, and the camera's estimated correlation of the covariance of consecutive position and attitude estimates to form estimates of the biases of the IMU's gyroscope and accelerometer.

7. The navigation system of claim 6, the inertial navigation system further configured to use the estimated biases of the IMU's gyroscope and accelerometer to correct the specific forces and angular rate signals, and forms an estimate of the current position, velocity, and attitude of the movable platform based on the corrected specific forces and angular rate signals.

8. The navigation system of claim 7, the GNSS receiver sensor further configured to provide an estimate velocity signal representative of the estimated velocity of the movable platform.

9. A navigation system for a movable platform comprising:
a camera sensor configured to provide sequential photographic images representative of the surroundings of the movable platform, the sequential photographic images having matching landmarks showing the same scene that are taken from different locations;
an IMU (Inertial Measurement Unit) sensor configured to provide specific force and angular rate signals representative of the current specific forces and rate of the movable platform;
a processor responsive to the camera photographic images to estimate the position and attitude of the movable platform, covariance of the estimated position and attitude estimates, and the covariance of the estimated consecutive position and attitude estimates;
the processor responsive to the camera's estimated position and attitude signal, the camera's estimated position and attitude covariance, the camera's estimated correlation of the covariance of consecutive position and attitude estimates, and the specific force and angular rate signals, the processor configured to provide a navigation solution representative of the estimated current position, velocity, and attitude of the movable platform, the processor further configured with a landmark database that stores the location and description of landmarks that are detected in photographic images representative of the surroundings of the movable platform and a landmark detection and tracking component that detects landmarks in photographic images representative of the surroundings of the movable platform; a triangulation component that triangulates the position of landmarks in photographic images representative of the surroundings of the movable platform; the landmark database storing the location and description of the landmarks for future use.

10. A navigation system for a movable platform comprising:
a GNSS receiver sensor configured to provide position signals representative of the estimated current position of the movable platform;
a camera sensor configured to provide sequential photographic images representative of the surroundings of the movable platform, the sequential photographic images having matching landmarks showing the same scene that are taken from different locations, the sequential photos having matched feature points between the sequential photographic images such that the same landmarks appear in different photographic images;
an IMU (Inertial Measurement Unit) sensor configured to provide specific force and angular rate signals representative of the current specific forces and rate of the movable platform;
a processor responsive to the camera photographic images to estimate the position and attitude of the movable platform, the covariance of the estimated position and attitude, and the covariance of the estimated sequential consecutive position and attitude;
the processor responsive to the GNSS receiver's estimated position signal, the camera's estimated position and attitude signal, the camera's estimated position and attitude covariance, the camera's estimated correlation of the covariance of consecutive position and attitude estimates, and the specific force and angular rate signals, the processor configured to provide a navigation solution representative of the estimated current position, velocity, and attitude of the movable platform, the processor further configured with a landmark database that stores the location and description of landmarks that are detected in photographic images representative of the surroundings of the movable platform and a landmark detection and tracking component that detects landmarks in photographic images representative of the surroundings of the movable platform; a triangulation component that triangulates the position of landmarks in photographic images representative of the surroundings of the movable platform; the landmark database storing the location and description of the landmarks for future use.

* * * * *